US012227345B2

(12) United States Patent
Ahn

(10) Patent No.: US 12,227,345 B2
(45) Date of Patent: Feb. 18, 2025

(54) CONTAINER STOPPER AND CONTAINER HAVING SAME COUPLED THERETO

(71) Applicant: Jin Hee Ahn, Yongin-si (KR)

(72) Inventor: Jin Hee Ahn, Yongin-si (KR)

( * ) Notice: Subject to any disclaimer, the term of this patent is extended or adjusted under 35 U.S.C. 154(b) by 0 days.

(21) Appl. No.: 17/925,086

(22) PCT Filed: May 17, 2021

(86) PCT No.: PCT/KR2021/006161
§ 371 (c)(1),
(2) Date: Nov. 14, 2022

(87) PCT Pub. No.: WO2021/230732
PCT Pub. Date: Nov. 18, 2021

(65) Prior Publication Data

US 2023/0192372 A1 Jun. 22, 2023

(30) Foreign Application Priority Data

May 15, 2020 (KR) ........................ 10-2020-0059244
Aug. 3, 2020 (KR) ........................ 10-2020-0097962

(51) Int. Cl.
*B65D 51/28* (2006.01)
*A61J 1/14* (2023.01)
*B65D 39/00* (2006.01)
*B65D 41/04* (2006.01)
*B65D 47/08* (2006.01)
*B65D 51/18* (2006.01)

(52) U.S. Cl.
CPC ............ *B65D 51/28* (2013.01); *A61J 1/1418* (2015.05); *A61J 1/1425* (2015.05); *B65D 39/0052* (2013.01); *B65D 41/0414* (2013.01); *B65D 47/0838* (2013.01); *B65D 51/18* (2013.01); *B65D 2251/0003* (2013.01)

(58) Field of Classification Search
CPC ........................... B65D 51/28; B65D 39/0052; B65D 41/0414; B65D 47/0838; B65D 51/18; B65D 2251/0003; A61J 1/1418; A61J 1/1425
USPC ......................................................... 220/521
See application file for complete search history.

(56) References Cited

U.S. PATENT DOCUMENTS 8,807,362 B2 * 8/2014 Lee ..................... B65D 51/002 206/568
2003/0000910 A1 1/2003 Jang
(Continued)

FOREIGN PATENT DOCUMENTS

CN 107054868 A * 8/2017 ............ B65D 51/18
JP 273090 Y1 4/1952
(Continued)

*Primary Examiner* — J. Gregory Pickett
*Assistant Examiner* — Niki M Eloshway
(74) *Attorney, Agent, or Firm* — Rabin & Berdo, P.C.

(57) ABSTRACT

Disclosed is a container stopper (100) coupled to a container inlet (12) of a container (10) in which content is held, the container stopper comprising: a stopper body (110) that is coupled to the container inlet (12) and has, on the upper side thereof, an auxiliary space (S1) in which auxiliary content (42) having a granular structure is held; and an upper cover (120) that is coupled to the stopper body (110), forms the auxiliary space (S1) together with the stopper body (110), and covers the auxiliary space (S1).

15 Claims, 22 Drawing Sheets

(56) References Cited

U.S. PATENT DOCUMENTS

| | | | | |
|---|---|---|---|---|
| 2006/0108314 | A1 * | 5/2006 | Cho | B65D 51/285<br>215/253 |
| 2011/0163103 | A1 * | 7/2011 | Lee | B65D 51/2864<br>220/521 |
| 2013/0206717 | A1 * | 8/2013 | Lane | A47J 31/0636<br>220/521 |
| 2019/0352065 | A1 | 11/2019 | Pham et al. | |
| 2020/0354124 | A1 * | 11/2020 | Taneva | B65D 39/02 |

FOREIGN PATENT DOCUMENTS

| | | | | | |
|---|---|---|---|---|---|
| JP | S5298649 | U | | 1/1977 | |
| JP | S59115766 | U | | 8/1984 | |
| JP | S62179954 | U | | 11/1987 | |
| JP | H028753 | U | | 1/1990 | |
| JP | H0273158 | U | | 6/1990 | |
| JP | 2002501462 | A | | 1/2002 | |
| JP | 3184024 | U | * | 6/2013 | B65D 47/043 |
| JP | 2013-133123 | A | | 7/2013 | |
| JP | 3185934 | U | | 9/2013 | |
| JP | 3226268 | U | | 4/2020 | |
| KR | 10-2011-0137003 | A | | 12/2011 | |
| KR | 10-2016-0024539 | A | | 3/2016 | |
| KR | 10-2017-0126366 | A | | 11/2017 | |
| WO | WO-2008002751 | A2 | * | 1/2008 | B65D 51/28 |
| WO | WO-2016106457 | A1 | * | 7/2016 | B65D 25/08 |
| WO | WO-2018109446 | A1 | * | 6/2018 | A23L 2/52 |

* cited by examiner

CONTAINER STOPPER AND CONTAINER HAVING SAME COUPLED THERETO

TECHNICAL FIELD

The present invention relates to a container stopper and, more specifically, to a container stopper coupled to a container inlet and a container having same coupled thereto.

BACKGROUND ART

Containers are sealed by coupling container stoppers to inlets of the containers in which contents such as liquid and powder are contained, and various kinds of container stoppers are coupled thereto according to types of the contents contained in the containers, discharging and opening methods, and the like.

The container stoppers coupled to the containers have various structures according to coupling methods and functions.

Also, among container stoppers according to the related art, the container stoppers having structures in which auxiliary contents in the form of granules are stored in the container stoppers so as to be taken together during drinking are disclosed in Patent documents 1, 2, 3, etc.

However, in Patent documents 1 to 3, the container stopper for storing the auxiliary contents of the granular structure has a structure in which a plurality of members are coupled to each other, and the manufacture thereof is complicated. In addition, recycling is inconvenient or impossible due to internal contamination.

Patent document 1: KR 10-2017-0126366 A0
Patent document 2: KR 10-2016-0024539 A
Patent document 3: JP 2013-133123 A

DISCLOSURE OF THE INVENTION

Technical Problem

To solve the above mentioned limitations, the purpose of the present invention is to provide: a container stopper that is easy to manufacture by simplifying the overall structure thereof and convenient for recycling by minimizing internal contamination; and a container to which the container stopper is coupled.

Technical Solution

The present invention has been made to achieve the above objective. Disclosed is a container stopper (100) coupled to a container inlet (12) of a container (10) in which content is held, the container stopper including: a stopper body (110) that is coupled to the container inlet (12) and has, on the upper side thereof, an auxiliary space (S1) in which auxiliary content (42) having a granular structure is held; and an upper cover (120) that is coupled to the stopper body (110), forms the auxiliary space (S1) together with the stopper body (110), and covers the auxiliary space (S1).

The stopper body (110) may be coupled to the container inlet (12) in a screw coupling or snap-fit coupling manner.

The stopper body (110) may include: a container coupling portion (111) coupled to the container inlet (12); and a cover coupling portion (112) extending upward from the container coupling portion (111) and coupled to the upper cover (120), wherein the container coupling portion (111) and the cover coupling portion (112) are divided vertically by a partition wall portion 140 coupled to the inner circumferential surface thereof.

The partition wall portion (140) may be formed integrally with the stopper body (110).

The partition wall portion (140) may be insertion-coupled to a recess groove or a protrusion formed on the inner circumferential surface of the stopper body (110).

The upper cover (120) and the cover coupling portion (112) may be provided with a sealing means for sealing the auxiliary space (S1) when coupled to each other.

The sealing means may include a cover inner ring (123) that is in close contact with the inner circumferential surface of the cover coupling portion (112) in a state in which the upper cover (120) is coupled to the cover coupling portion (112).

The sealing means may include one or more annular protrusion portions (118) which protrude from the inner circumferential surface of the cover coupling portion (112) to be in close contact with the outer circumferential surface of the cover inner ring (123).

The sealing means may include: one or more first concave-convex portions (811) formed at the upper end of the cover coupling portion (112); and a second concave-convex portion (821) which is formed at the lower end of the upper cover (120) to be shape-fitted to and in close contact with the first concave-convex portions (811) in a state in which the upper cover (120) is coupled to the cover coupling portion (112).

The upper cover (120) may be coupled to the cover coupling portion (112) in a screw coupling or snap-fit coupling manner.

The upper cover (120) may be coupled to the cover coupling portion (112) by a hinge portion (150) at one end of a reference line that passes through the center of the upper cover (120), and may be detached by rotating about the hinge portion (150) with respect to the cover coupling portion (112).

Advantageous Effects

The container stopper and the container having same coupled thereto according to the present invention is provided with an auxiliary space for storing auxiliary contents, and thus, the container stopper may have various functions.

Also, in the container stopper and the container having same coupled thereto according to the present invention, when the auxiliary space is formed, the partition wall portion for dividing a region vertically is used to form the auxiliary space, and thus, the manufacturing cost can be significantly reduced by the simple structure and convenient manufacturing.

In addition, in the container stopper and the container having same coupled thereto according to the present invention, the partition wall portion that forms the auxiliary space is additionally provided with the discharge hole for discharging the contents contained in the container, and thus, the functions of storing the auxiliary contents and discharging the auxiliary contents from the container become convenient.

MODE FOR CARRYING OUT THE INVENTION

Hereinafter, a container stopper and a container having same coupled thereto according to the present invention will be described with reference to the accompanying drawings.

Figure 1:
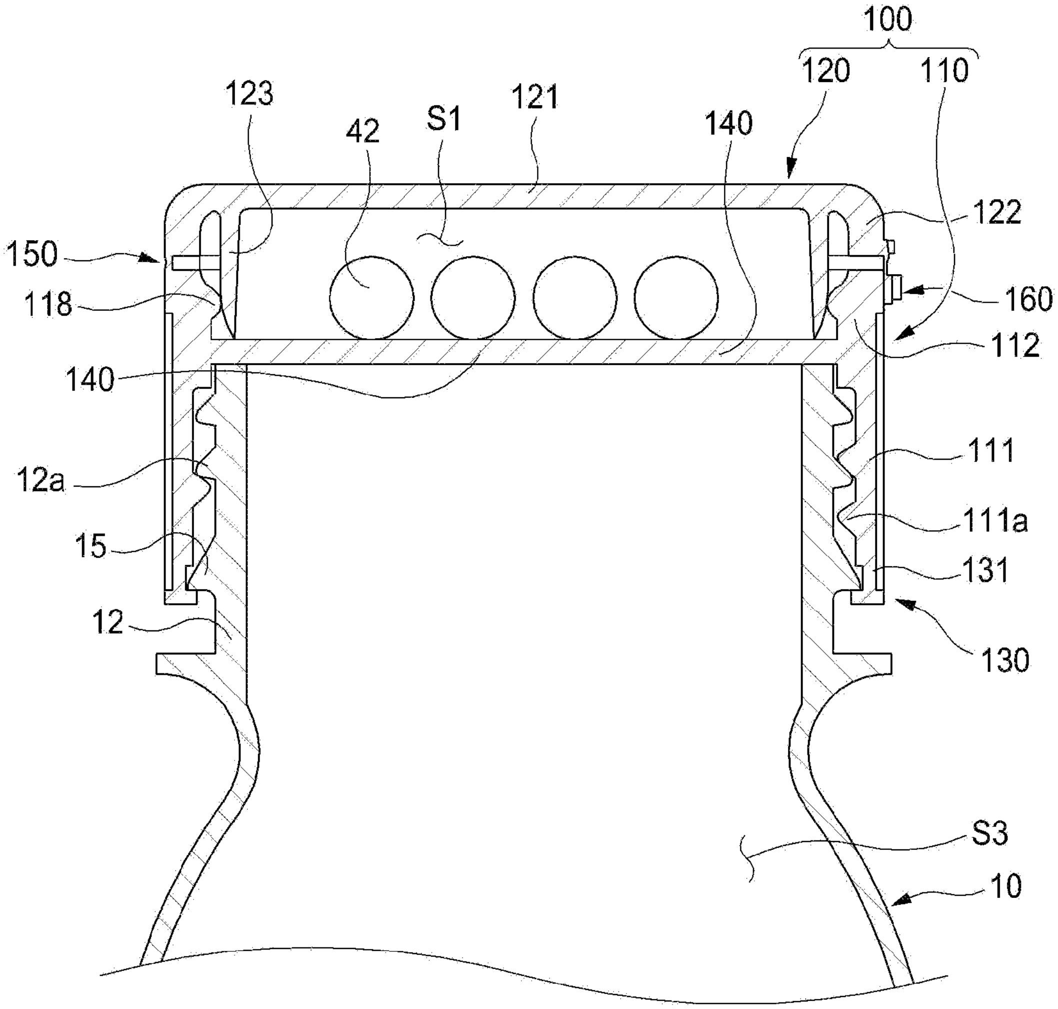
FIG. 1 is a partial cross-sectional view showing a container stopper and a container having same coupled thereto according to a first embodiment of the present invention.
Figure 2:
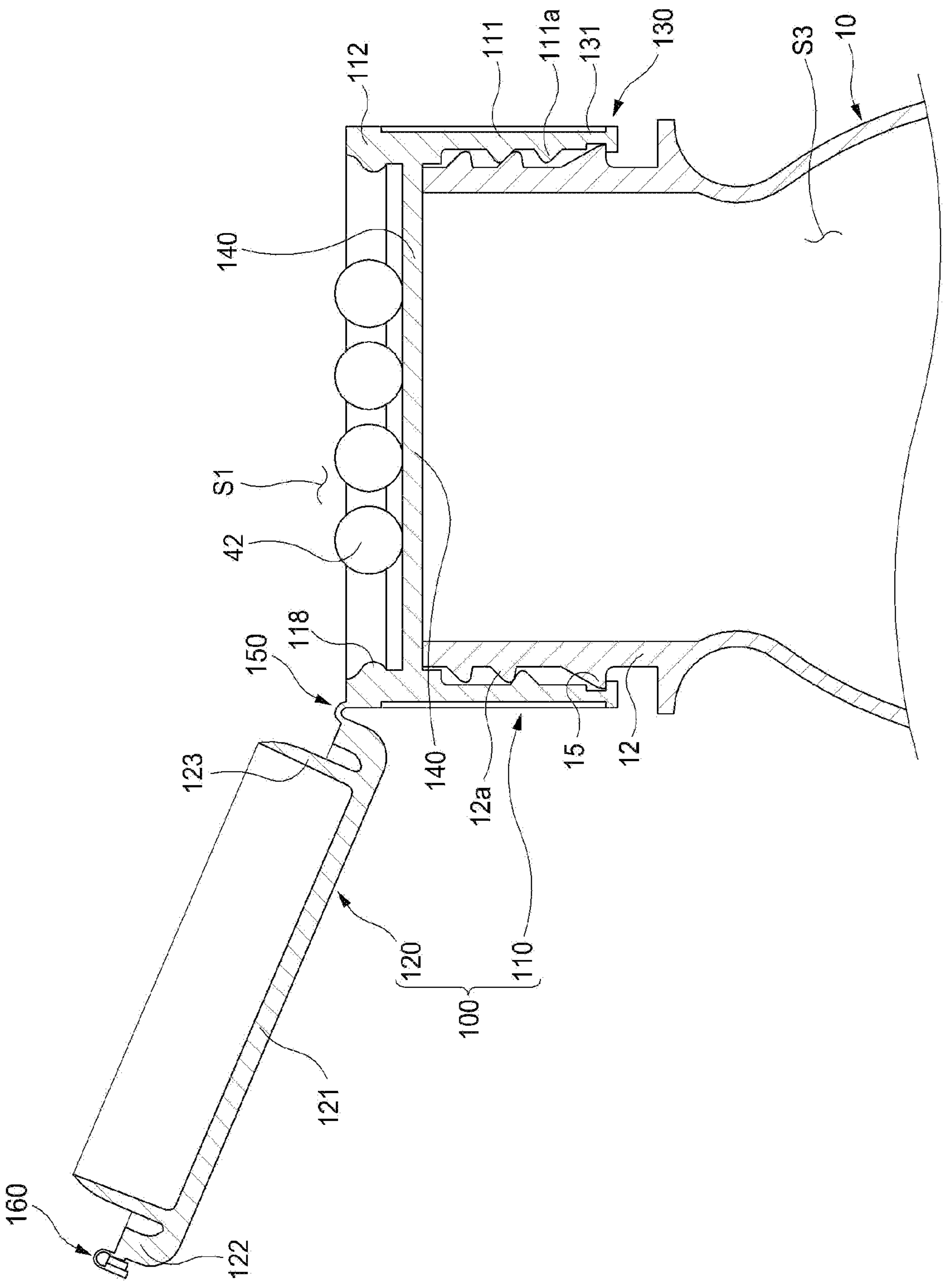
FIG. 2 is a partial cross-sectional view showing a state in which an upper cover of the container stopper of FIG. 1 is separated from a stopper body.

Referring to a container stopper according to a first embodiment of the present invention as illustrated in FIGS. 1 and 2, a container stopper 100 is coupled to a container inlet 12 of a container 10 in which content is held, the container stopper including: a stopper body 110 that is coupled to the container inlet 12 and has, on the upper side thereof, an auxiliary space S1 in which auxiliary contents 42 having a granular structure is held; and an upper cover 120 that is coupled to the stopper body 110, forms the auxiliary space S1 together with the stopper body 110, and covers the auxiliary space S1.

The container 10 is configured to contain liquid materials such as beverages and powder-type materials, and various configurations are possible as long as the container has the container inlet 12 for discharging materials from the container.

The contents contained in the container 10 may include various substances, depending on a liquid material to be drunk together with solid pills of auxiliary contents 42 and a combination with the auxiliary contents. The contents usually include a liquid material.

Also, in the container 10, a portion except for the container inlet 12 may have various shapes, such as a cylindrical shape and a quadrangular pillar shape.

Also, the container 10 may have materials such as plastic materials or glass.

Meanwhile, the container inlet 12 serves as an outlet through which the contents are discharged to the outside, and is a part that is opened and closed by the opening and closing of the container stopper 100, and various structures are possible depending on the coupling structure of the container inlet 12.

The stopper body 110 is coupled to the container inlet 12 and configured to form an auxiliary space S1 in which the auxiliary contents 42 of the granular structure are contained on the upper side. The stopper body may have various configurations depending on the coupling structure with the container inlet 12 and the coupling structure with the upper cover 120.

The stopper body 110 may be coupled to the container inlet 12 by various coupling structures such as screw coupling or snap-fit coupling.

In particular, the stopper body 110 can seal the inside of the container 10 when coupled to the container inlet 12, and it is preferable that a sealing member (not shown) is interposed and installed. However, the stopper body may have the coupling structure disclosed in International Publication No. WO 2021/017348 without installation of a sealing member.

Also, the stopper body 110 may include: a container coupling portion 111 coupled to the container inlet 12; and a cover coupling portion 112 extending upward from the container coupling portion 111 and coupled to the upper cover 120.

The container coupling portion 111 is a portion coupled to the container inlet 12, and may be configured in various ways depending on the coupling structure with the container inlet 12.

That is, the container coupling portion 111 may be coupled to the container inlet 12 by various coupling structures such as screw coupling or snap-fit coupling.

In particular, the container coupling portion 111 can seal the inside of the container 10 when coupled to the container inlet 12, and it is preferable that a sealing member (not shown) is interposed and installed. However, the container coupling portion may have the coupling structure disclosed in International Publication No. WO 2021/017348 without installation of a sealing member.

In addition, in the container coupling portion 111 as illustrated in FIGS. 1 and 2, a skirt portion 130 may be connected by a plurality of bridges 131. The skirt portion is locked to a locking protrusion 15 which is formed on the outer circumferential surface of the container inlet 12 to check whether the container has been opened in a state in which the container coupling portion is coupled to the container inlet 12.

Also, when screw-coupled to the container inlet 12, the container coupling portion 111 may have a female threaded portion 111*a* which is screw-coupled to a male threaded portion 12*a* formed in the container inlet 12.

The cover coupling portion 112 is a portion that extends upward from the container coupling portion 111 and is coupled to the upper cover 120. This portion may have various configurations depending on the coupling structure with the upper cover 120, and thus will be described together with the upper cover 120.

Also, it is preferable that the container coupling portion 111 and the cover coupling portion 112 are divided vertically by a partition wall portion 140 coupled to the inner circumferential surface so as to form the auxiliary space S1.

The partition wall portion 140 is coupled to the inner circumferential surface of the stopper body 110 to form the auxiliary space S1 and configured to divide the container coupling portion 111 and the cover coupling portion 112 vertically, and may have various configurations depending on the vertically dividing structure.

In an example, as illustrated in FIGS. 1 and 2, the partition wall portion 140 may have a disc shape, and may be formed integrally with the stopper body 110 or may be insertion-coupled to a recess groove or a protrusion 117 formed on the inner circumferential surface of the stopper body 110.

Meanwhile, in addition to the disc shape, the partition wall portion 140 may have various shapes and structures according to embodiments to be described later in order to reinforce the function and coupling structure with the container inlet 12.

The upper cover 120 is coupled to the stopper body 110 to form the auxiliary space S1 together with the stopper body 110 and is configured to cover the auxiliary space S1, and may have various configurations according to the coupling structure with the cover coupling portion 112.

Here, the upper cover 120 is coupled to the cover coupling portion 112 by a hinge portion 150 at one end of the reference line that passes through the center of the upper cover 120 as illustrated in FIGS. 1 to 8. The upper cover may be detached by rotating about the hinge portion 150 with respect to the cover coupling portion 112.

In addition, the upper cover 120 may include: an upper surface portion 121 that is parallel to the partition wall portion 140, which will be described later, and forms an upper surface of the container stopper; and a side wall portion 122 that extends downward from the edge of the upper surface portion 121.

The upper surface portion 121 is a portion that is parallel to the partition wall portion 140 and forms the upper surface of the container stopper, and this portion may have a disc shape.

Also, the overall shape of the upper surface portion 121 may be changed to exert a function and, for example, the central portion thereof may be slightly concave depending on design, stacking conditions, etc.

The side wall portion 122 is an extension portion of the outer circumferential surface of the stopper body 110, and extends from the upper surface portion 121 and will be described later. This portion may be modified in various ways depending on the design, stacking conditions, etc.

The hinge portion 150 is configured to connect the cover coupling portion 112 to the upper cover 120 at one end of the reference line that passes through the center of the upper cover 120. This connection can be established by various methods as long as the upper cover 120 is hinge-rotatable with respect to the cover coupling portion 112.

In particular, the thickness and width of the hinge portion 150 may be determined, in order to enable hinge rotation of the upper cover 120 with respect to the cover coupling portion 112 and to maintain the opened state to some extent.

In addition, when the upper cover 120 is coupled to the upper cover 120 while being coupled to the hinge portion 150, a separate sealing means is provided as illustrated in FIGS. 1 to 4. In order to facilitate the hinge rotation, the lower end of the upper cover 120 and the upper end of the cover coupling portion 112 may be coupled to each other with a gap.

Also, when the upper cover 120 is coupled to the upper cover 120 while being coupled to the hinge portion 150, it is preferable that a handle portion 160 is formed in a region opposite to the hinge portion 150 so that a user can conveniently separate the upper cover 120 from the cover coupling portion 112.

The handle portion 160 is configured to be formed in a region opposite to the hinge portion 150 so that the user can conveniently separate the upper cover 120 from the cover coupling portion 112, and the handle portion may have various structures.

For example, the handle portion 160 may have a structure similar to that of a separation portion disclosed in International Publication No. WO 2021/017348.

In addition, the handle portion 160 may be integrally formed with the upper cover 120 at a region opposite to the hinge portion 150, and may extend toward the outside of the cover coupling portion 112.

Also, as illustrated in FIG. 2, the handle portion 160 is tilted upward when the user separates the upper cover 120 from the cover coupling portion 112. The handle portion may be held while being fixed to the outer circumferential surface of the upper cover 120.

Here, a coupling portion 161 for coupling with the handle portion 160 may be formed on the outer circumferential surface of the upper cover 120.

The coupling portion 161 is a portion that is formed on the outer circumferential surface of the upper cover 120 for coupling with the handle portion 160, and this portion may have various structures depending on the coupling structure such as insertion coupling.

Also, the handle portion 160 is coupled to the cover coupling portion 112, and then may be maintained while being coupled to the cover coupling portion 112 by an adhesive or the like so as to check whether the container has been opened.

When manufactured in consideration of the feasibility of injection molding, the handle portion 160 may be manufactured in a connected state by the cover coupling portion 112, bridges, and the like, in order to check whether the container has been opened.

In addition, the handle portion 160 may be maintained while being coupled to a separate coupling portion (not shown) that is formed on the outer circumferential surface of the cover coupling portion 112 in a state in which the upper cover 120 is coupled to the stopper body 110.

The coupling between the handle portion 160 and the coupling portion may have various coupling structures such as insertion coupling.

When the upper cover 120 has a structure that is coupled to the cover coupling portion 112 by the hinge portion 150, the upper cover 120 and the stopper body 110 may be integrally formed by plastic injection molding and thus conveniently manufactured.

Furthermore, the upper cover 120 and the stopper body 110 are integrally with each other even during use, and convenient use is possible. Moreover, there is a great industrial advantage due to convenient recycling.

Figure 8:
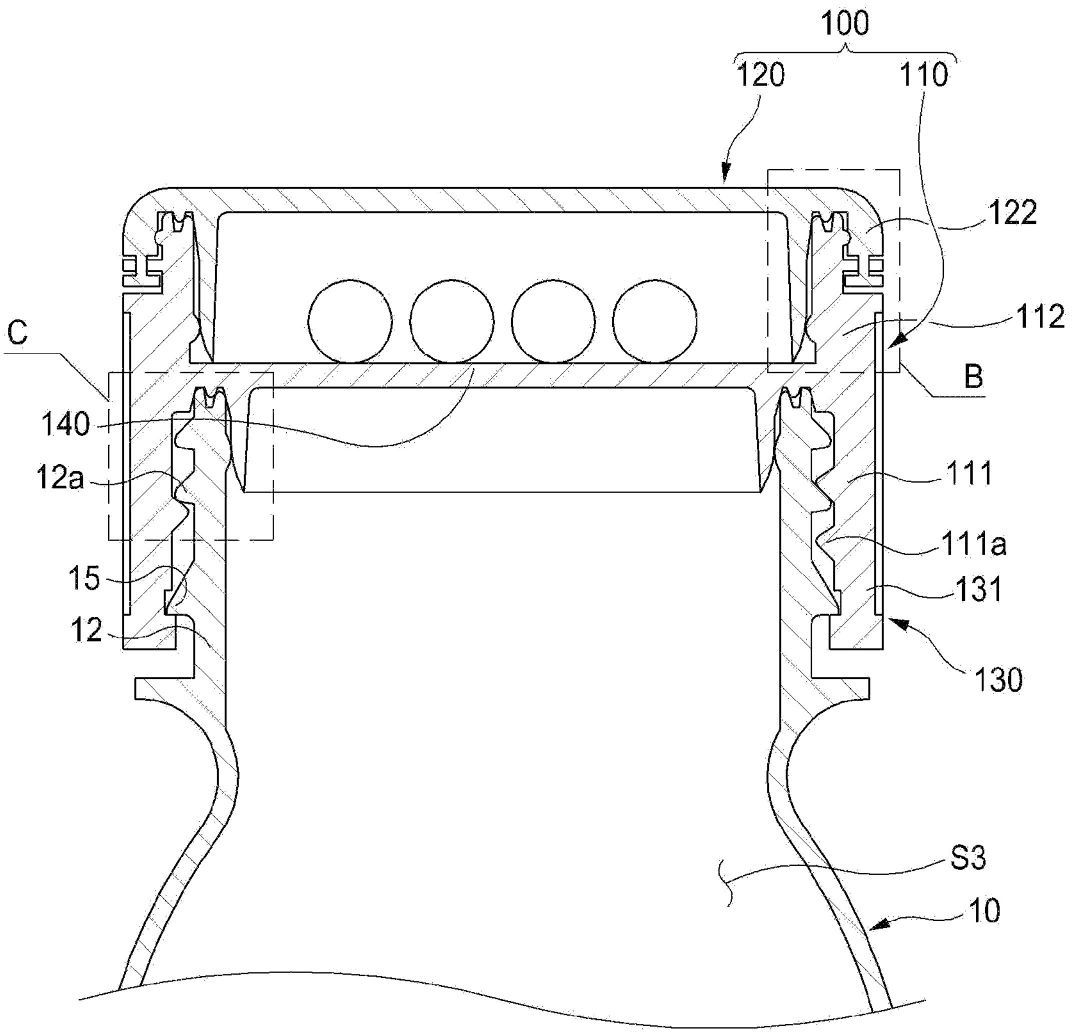
FIG. 8 is a partial cross-sectional view showing a container stopper according to a fourth embodiment of the present invention.

As illustrated in FIG. 8, the upper cover 120 may be coupled to the cover coupling portion 112 by snap-fit coupling, or may be coupled to the cover coupling portion 112 by screw coupling.

Here, the present invention is characterized by the coupling between the upper cover 120 and the cover coupling portion 112 and the forming of the above-described auxiliary space S1 by the partition wall portion.

Here, the auxiliary space S1 is a space for containing auxiliary contents distinguished from contents contained in the container 10, and the auxiliary contents for combination with the contents may be contained therein.

In particular, the auxiliary content contained in the auxiliary space S1 is an auxiliary material that is separated from the liquid contents contained in the container 10 before drinking and is then taken together with the contents during drinking. The auxiliary contents may include auxiliary contents (tablet medicine, etc.) of a powder or granular structure rather than a liquid material.

Also, it is preferable that the auxiliary space S1 is blocked from the outside air in consideration of the fact that the separate auxiliary contents 41 are contained therein.

Accordingly, it is preferable that the upper cover 120 and the cover coupling portion 112 are provided with a sealing means for sealing the auxiliary space S1 when coupled to each other.

The sealing means is configured to seal the auxiliary space S1 when coupled to each other. According to the coupling structure of the upper cover 120 and the cover coupling portion 112, in particular, the coupling structure described above, various configurations are possible in a plurality of embodiments (embodiments 1 to 6).

For example, as illustrated in FIGS. 1 and 2, the sealing means may include a cover inner ring 123 that is in close contact with the inner circumferential surface of the cover coupling portion 112 in a state in which the upper cover 120 and the cover coupling portion 112 are coupled to each other.

The cover inner ring 123 is formed inside the side wall portion 122 of the upper cover 120 described above and configured to be in close contact with the inner circumferential surface of the cover coupling portion 112 in a state in which the upper cover 120 is coupled to the cover coupling portion 112. The cover inner ring may have various configurations.

For example, the cover inner ring 123 may protrude downward from the bottom surface of the upper cover 120.

In addition, the cover inner ring 123 has a thickness that enables elastic deformation in consideration of close contact with the inner circumferential surface of the cover coupling portion 112, and it is preferable that the thickness thereof decreases gradually in the downward direction.

In addition, in consideration of being inserted into the inner circumferential surface of the cover coupling portion 112, it is preferable that the outer circumferential surface of the cover inner ring 123 forms an inclination 123*a* toward the center in a direction toward the lower end.

Also, in order to reinforce a sealing state when the cover inner ring 123 is in close contact with the inner circumferential surface of the cover coupling portion 112, the sealing means may further include one or more annular protrusion portions 118 which protrude from the inner circumferential surface of the cover coupling portion 112 to be in close contact with the outer circumferential surface of the cover inner ring 123 as illustrated in FIGS. 1 and 2.

The annular protrusion portions 118 have one or more ring structures that protrude from the inner circumferential surface of the cover coupling portion 112 so as to be in close contact with the outer circumferential surface of the cover inner ring 123. These annular protrusion portions may have a structure that protrudes convexly from the inner circumferential surface of the cover coupling portion 112.

The container stopper according to the present invention having the structure as described above is coupled to the container inlet 12 of the container 10 that contains the liquid contents, and the auxiliary contents 41 that can be taken together when drinking the liquid contents are stored in the auxiliary space S1. Accordingly, it is possible to maximize the functions of the container.

In particular, in a container stopper according to the related art, when forming a structure for storing auxiliary contents, a plurality of members have to be provided, or a container inlet 12 has to be changed. Therefore, the structure thereof becomes complicated, and the manufacturing cost is high. However, in the present invention, since the container stopper is formed by an integral structure or a simple structure, manufacturing is simplified. In particular, collection for recycling is conveniently accomplished by the single structure.

Also, the basic essential point of the present invention is to provide a simple structure of the container stopper having the auxiliary space for storing the auxiliary contents. Various embodiments are possible according to the coupling structure between the stopper body 110 and the upper cover 120.

Hereinafter, modified embodiments of the first embodiment of the present invention will be described with a focus on differences from the first embodiment. Here, the same or similar description to the first embodiment of the present invention is omitted for convenience.

A container stopper according to a second embodiment of the present invention is an embodiment that further includes an auxiliary container 30 for containing second auxiliary contents in addition to the configuration of the first embodiment of the present invention.

Hereinafter, a container stopper according to a second embodiment of the present invention will be described with a focus on differences from the first embodiment.

The auxiliary container 30 is a container coupled to the stopper body 110 and containing second auxiliary contents which are the same as the auxiliary contents provided in the auxiliary space S1 or different therefrom, and this container has various configurations depending on the coupling structure of the stopper body 110.

For example, the auxiliary container 30 may include: an upper portion 31 which is coupled to the container coupling portion 111 by insertion-coupling with the inner circumferential surface of the container coupling portion 111; a side wall portion 32 which extends downward from the upper portion 31 and forms a second auxiliary space S2; and a cover portion 33 which is detachably coupled to the lower end of the side wall portion 32 and covers the second auxiliary space S2.

The upper portion 31 is configured to be coupled to the container coupling portion 111 by insertion-coupling with the inner circumferential surface of the container coupling portion 111, and this portion may have various configurations.

For example, the upper portion 31 may have a disc structure that is in close contact with the bottom surface of the partition wall portion 140 described above.

Also, the edge of the upper portion 31 is disposed between the bottom surface of the partition wall portion 140 and the upper end of the container inlet 12, and thus may serve as a sealing member for sealing an inner space S3 of the container 10.

The side wall portion 32 is configured to extend downward from the upper portion 31 to form the second auxiliary space S2, and this portion may have various configurations.

For example, the side wall portion 32 extends downward from the upper portion 31, and thus, the second auxiliary space S2 may be formed into a cylindrical space.

The cover portion 33 is configured to be detachably coupled to the lower end of the side wall portion 32 to cover the second auxiliary space S2, and it is preferable that the cover portion is airtightly coupled in order to prevent mixing with the contents inside the container 10 described above.

Figure 3:
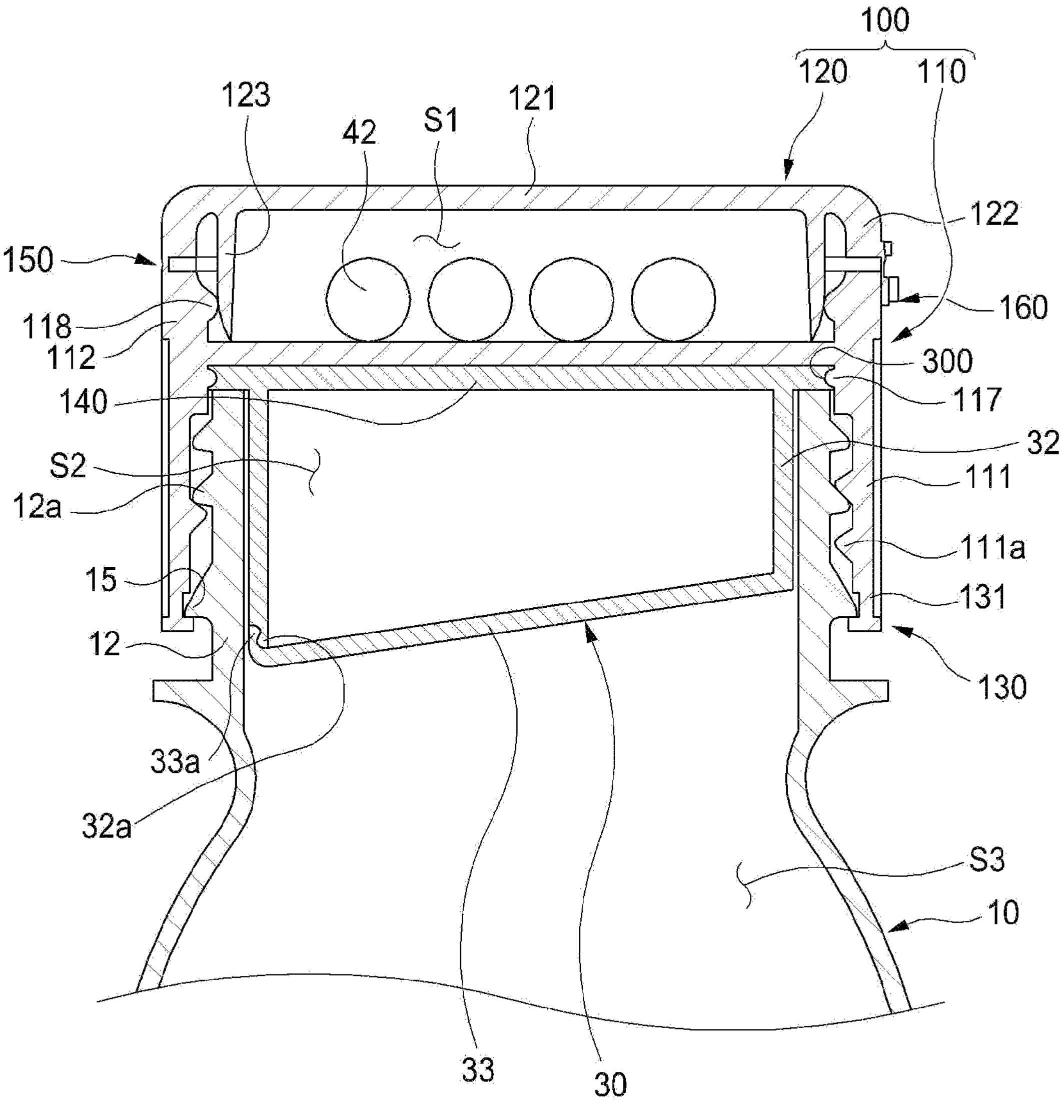
FIG. 3 is a partial cross-sectional view showing a container stopper and a container having same coupled thereto according to a second embodiment of the present invention.
Figure 4:
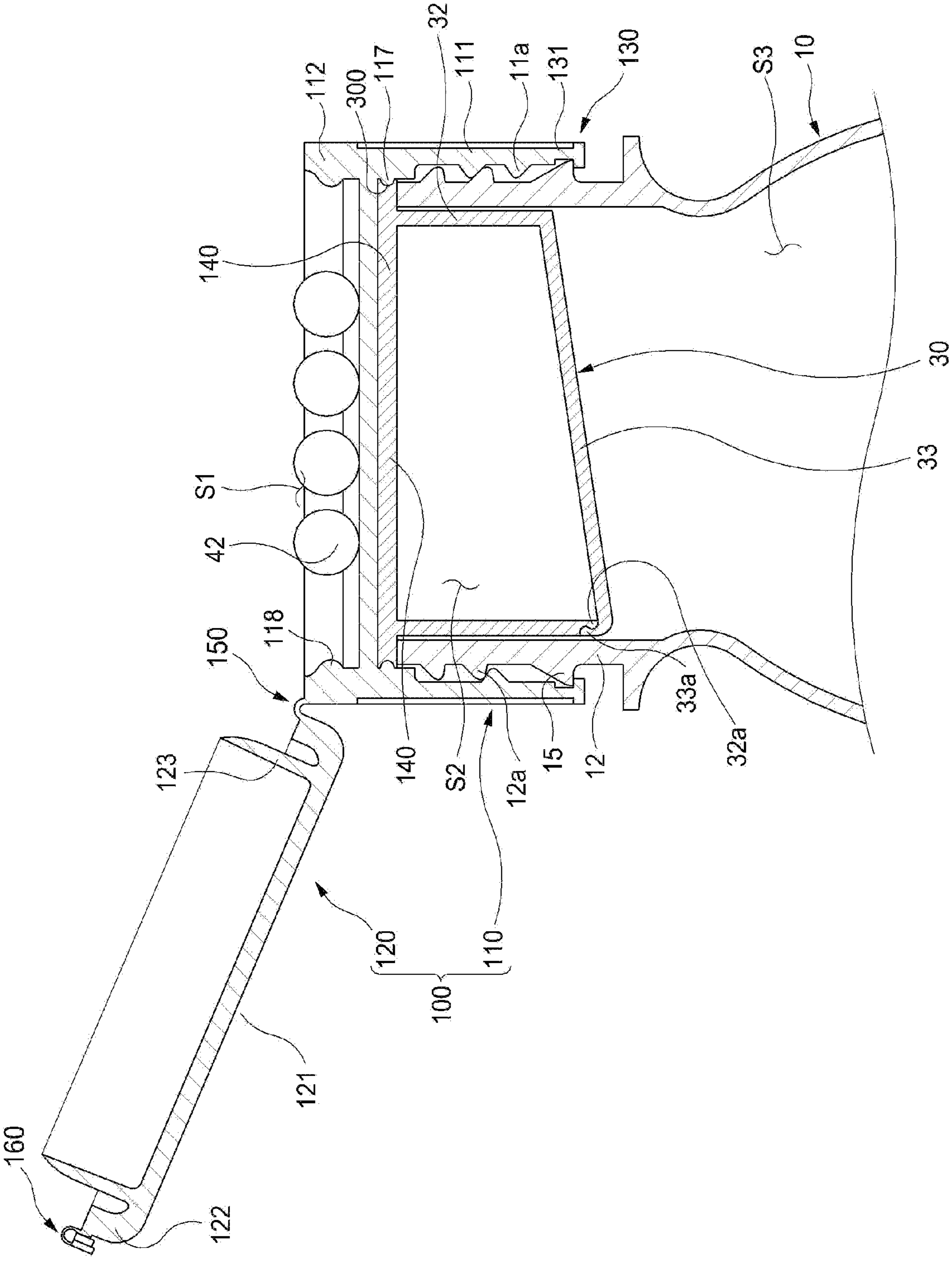
FIG. 4 is a partial cross-sectional view showing a state in which an upper cover of the container stopper of FIG. 3 is separated from a stopper body.

As illustrated in FIGS. 3 and 4, one end of the cover portion 33 may be hinge-coupled to the side wall portion 32, and the other end thereof may be insertion-coupled thereto by a protrusion 33*a* and a recess portion 32*a*.

Also, the cover portion 33 may integrate with the upper portion 31 and the side wall portion 32 through plastic injection molding, or may be formed as a sealing member that seals the lower end of the side wall portion 32 by using induction, conduction, or the like.

Here, an example, in which the upper portion 31 of the auxiliary container 30 is formed separately from the partition wall portion 140, has been described. However, the stopper body 110 is vertically penetrated, and the upper portion 31 of the auxiliary container 30 is detachably installed to the inner circumferential surface of the stopper body 110. Accordingly, the upper portion may also be configured as the partition wall portion 140.

Specifically, an embodiment of FIG. 3 may be embodied by integrating the partition wall portion 140 and the upper portion 31 of the auxiliary container 30 and detachably installing the upper portion 31 of the auxiliary container 30 to the inner circumferential surface of the stopper body 110.

That is, in FIG. 3, an example, in which a portion other than the edge of the upper portion 31 of the auxiliary container 30 is removed from the partition wall portion 140, may be embodied.

The container stopper according to the second embodiment having the configuration as described above is further provided with the auxiliary container 30 for forming the second auxiliary space S2 in addition to the auxiliary space S1 formed above the partition wall portion 140. Accordingly, when the contents stored in the container 10 is drunk, the second auxiliary contents in addition to the auxiliary contents are additionally provided, and thus, various functions may be obtained.

Also, considering that the auxiliary contents are stored in the auxiliary space S1 as described above, the auxiliary space S1 needs to be sealed so that outside air does not flow therein.

Hereinafter, a third embodiment having a sealing means for sealing the auxiliary space S1 separately from or together with the sealing means disclosed in the first embodiment of the present invention will be described.

Figure 5:
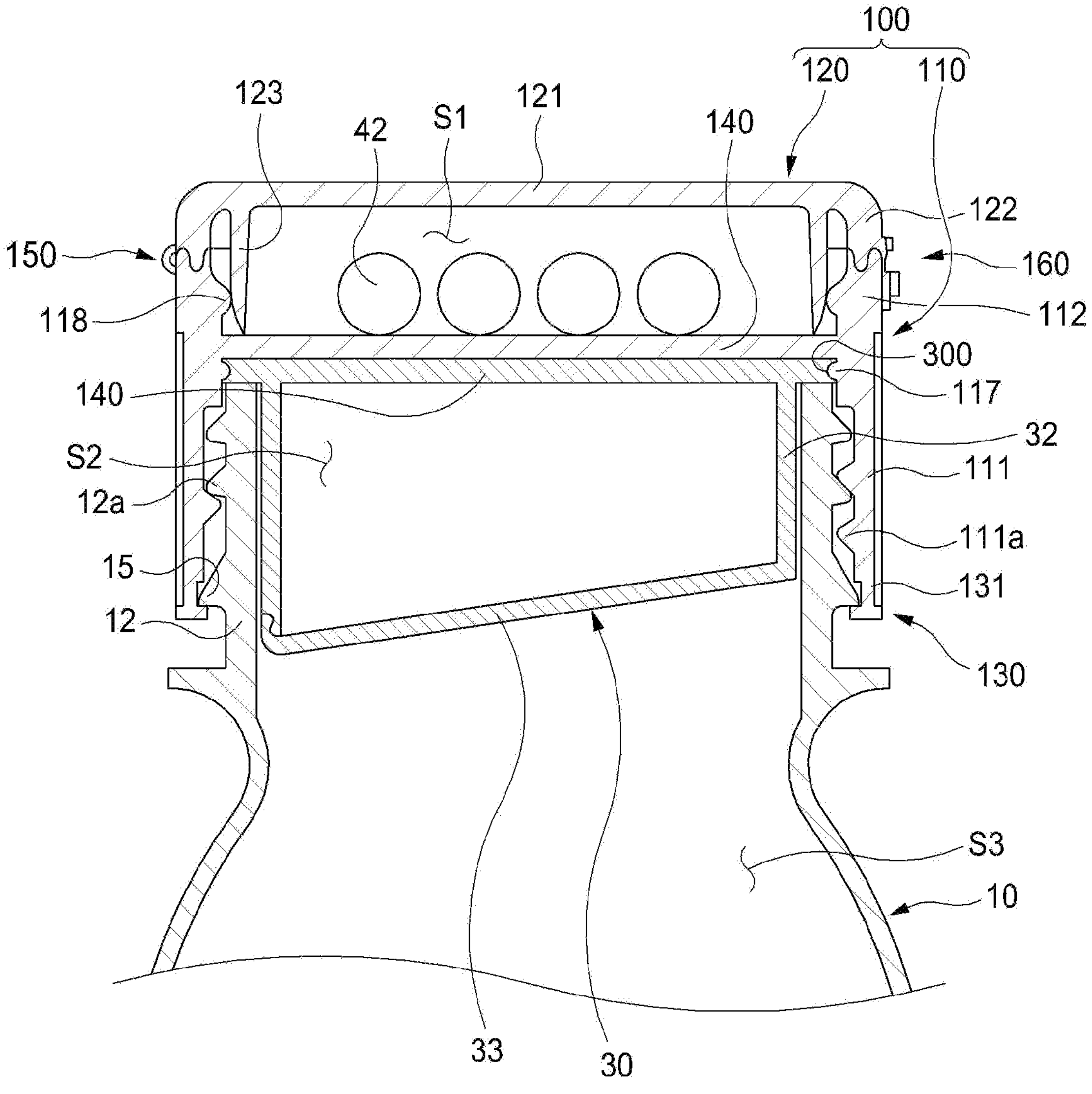
FIG. 5 is a partial cross-sectional view showing a container stopper according to a third embodiment of the present invention.
Figure 6:
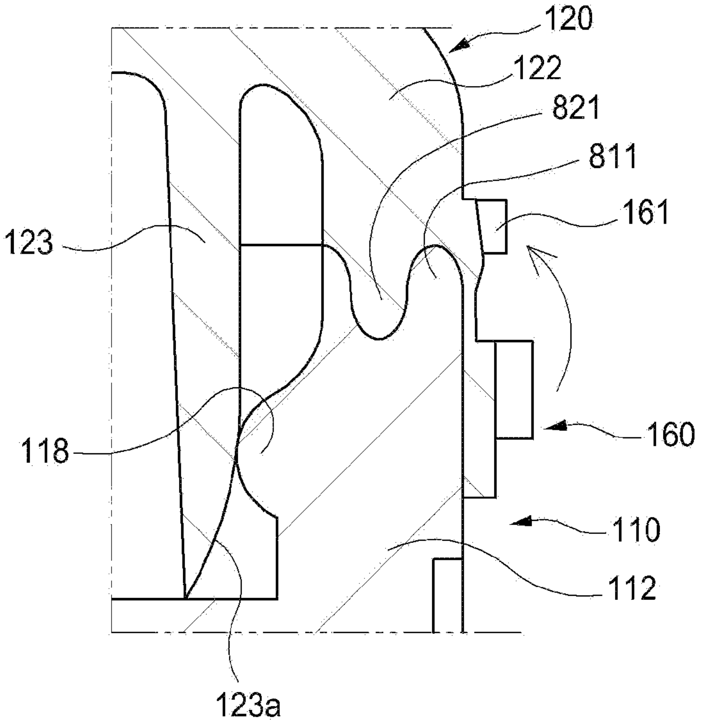
FIG. 6 is a partial enlarged cross-sectional view showing a region A of FIG. 5.
Figure 7:
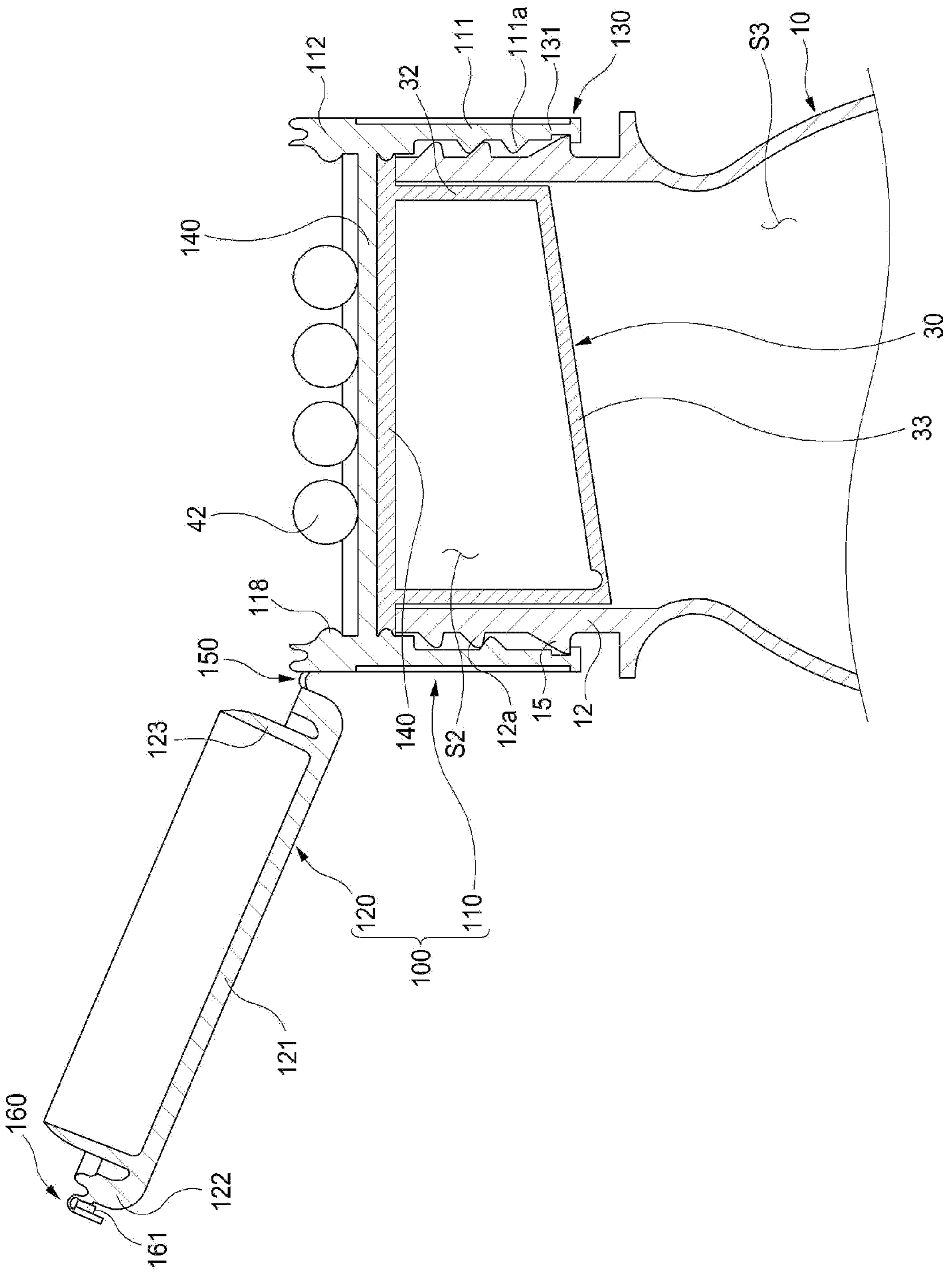
FIG. 7 is a partial cross-sectional view showing a state in which an upper cover of the container stopper of FIG. 5 is separated from a stopper body.

As illustrated in FIGS. 5 to 7, a container stopper according to the third embodiment of the present invention is provided with a sealing means for sealing the auxiliary space S1 separately from or together with the sealing means disclosed in the first embodiment of the present invention.

The sealing means may include: one or more first concave-convex portions 811 formed at the upper end of the cover coupling portion 112; and a second concave-convex portion 821 which is formed at the lower end of the upper cover 120 to be shape-fitted to and in close contact with the first concave-convex portions 811 in a state in which the upper cover 120 is coupled to the cover coupling portion 112.

The sealing means disclosed in the second embodiment of the present invention is provided at the lower end of the upper cover 120 and the upper end of the cover coupling portion 112 so as to seal the auxiliary space S1, and this sealing means has a concave-convex structure.

The first concave-convex portions 811 include one or more protrusions and recesses formed at the upper end of the cover coupling portion 112, and may have various configurations depending on the shape of the second concave-convex portion 821 which will be described later.

For example, the first concave-convex portions 811 may include a pair of protrusions that form a groove so that a protrusion of the second concave-convex portion 821 is inserted, which will be described later.

Here, the first concave-convex portions 811 are shown just as protrusions in the cross-sectional structure, and have a ring shape when viewed from the top.

The second concave-convex portion 821 is configured to be formed at the lower end of the upper cover 120 to be shape-fitted to and in close contact with the first concave-convex portions 811 in a state in which the upper cover 120 is coupled to the cover coupling portion 112, and the second concave-convex portion may have various configurations.

For example, the second concave-convex portion 821 may include a protrusion which is inserted into the groove formed by the pair of protrusions of the first concave-convex portions 811 described above.

Also, considering that the auxiliary contents are stored in the auxiliary space S1 as described above, the auxiliary space S1 needs to be sealed so that outside air does not flow therein.

Hereinafter, a fourth embodiment having a sealing means for sealing the auxiliary space S1 separately from or together with the sealing means disclosed in the first embodiment of the present invention will be described.

Compared to the first embodiment, the container stopper according to the fourth embodiment is modified in the snap-fit coupling structure between the upper cover and the cover coupling portion and the coupling structure between the container coupling portion and the container inlet.

First, as illustrated in FIG. 8, an upper cover 120 as a separate member may be coupled to a cover coupling portion 112 by snap-fit coupling, instead of being integrated with the cover coupling portion 112.

To this end, one of the upper cover 120 or the cover coupling portion 112 may have an annular protrusion 831, and the other one may have an annular recess groove 841.

Figure 9:
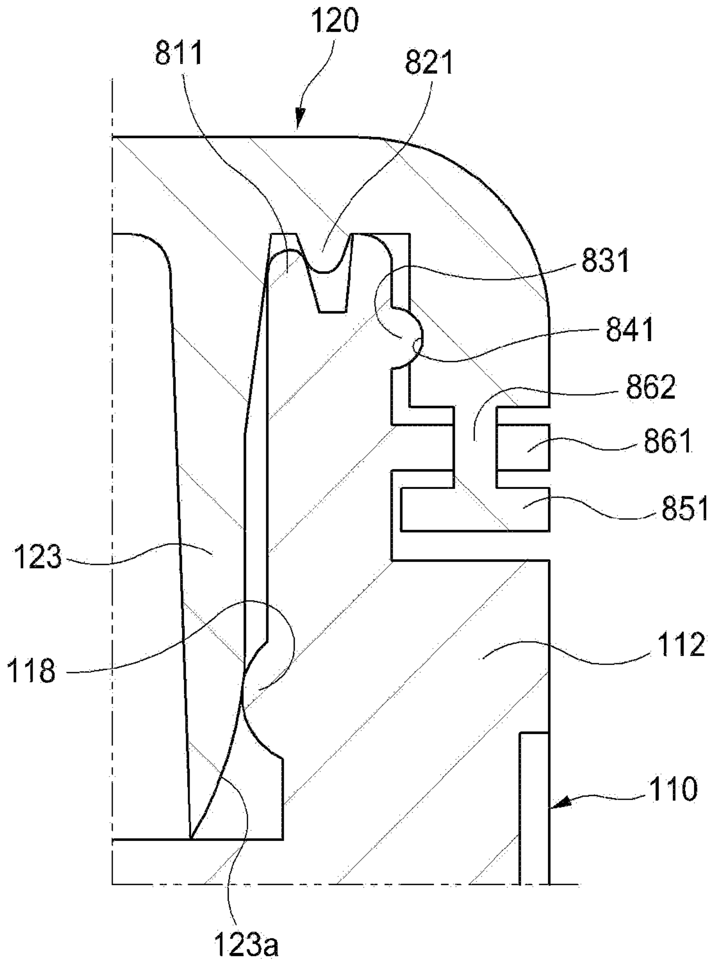
FIG. 9 is an enlarged cross-sectional view showing a region B of FIG. 8.
Figure 10:
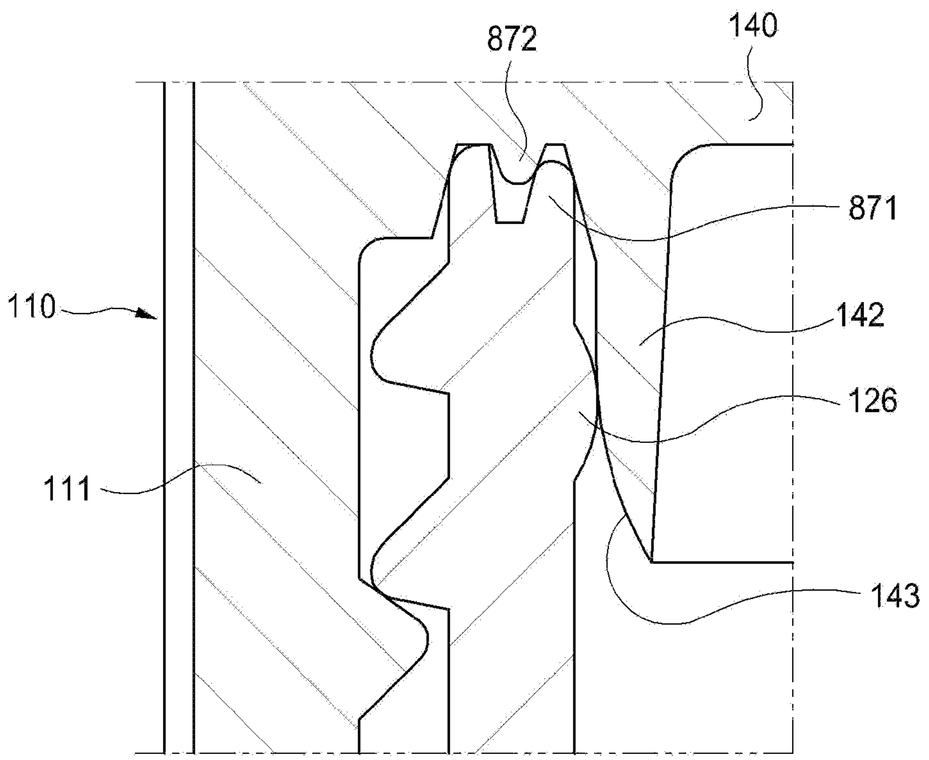
FIG. 10 is an enlarged cross-sectional view showing a region C of FIG. 8.

Also, in order to check whether the first separation from the cover coupling portion 112 has been made, the upper cover 120 may include an auxiliary skirt portion 851 connected by a plurality of auxiliary bridges 862 as illustrated in FIGS. 9 and 10.

As illustrated in FIG. 9, the auxiliary skirt portion 851 is locked to an annular protrusion 861 formed on the outer circumferential surface of the cover coupling portion 112, and may be separated from the upper cover 120 by cutting of the auxiliary bridges 862 when the upper cover 120 is separated from the cover coupling portion 112.

Next, as a sealing means for sealing the auxiliary space S1 described above, the sealing means may be provided at the lower end of the upper cover 120 and the upper end of the cover coupling portion 112. This sealing means has a similar configuration to that of the third embodiment, and thus, a detailed description thereof will be omitted.

Next, a container sealing means for sealing the inside of the container 10 when the container coupling portion 111 and the container inlet 12 are coupled may be additionally provided.

The container sealing means may have various configurations depending on a container sealing structure.

For example, as illustrated in FIGS. 10, the container sealing means may include a stopper inner ring 142 that is in close contact with the inner circumferential surface of the container inlet 12 in a state in which the stopper body 110 and the container inlet 12 are coupled to each other.

The stopper inner ring 142 is configured to be in close contact with the inner circumferential surface of the container inlet 12 in a state in which the container coupling portion 111 is coupled to the container inlet 12, and this stopper inner ring may have various configurations.

For example, the stopper inner ring 142 may protrude downward from the bottom surface of the partition wall portion 140.

In addition, the stopper inner ring 123 has a thickness that enables elastic deformation in consideration of close contact with the inner circumferential surface of the container inlet 12, and it is preferable that the thickness thereof decreases gradually in the downward direction.

In addition, in consideration of being inserted into the inner circumferential surface of the container inlet 12, it is preferable that the outer circumferential surface of the stopper inner ring 142 forms an inclination 143 toward the center in a direction toward the lower end.

Also, in order to reinforce a sealing state when the stopper inner ring 142 is in close contact with the inner circumferential surface of the container inlet 12, one or more annular protrusion portions 12*b* may be further provided, which protrude from the inner circumferential surface of the container inlet 12 to be in close contact with the outer circumferential surface of the stopper inner ring 142.

The annular protrusion portions 12*b* have one or more ring structures that protrude from the inner circumferential surface of the container inlet 12 so as to be in close contact with the outer circumferential surface of the stopper inner ring 142. These annular protrusion portions may have a structure that protrudes convexly from the inner circumferential surface of the container inlet 12.

In addition, as described above, a structure for sealing the container 10, such as the structure disclosed in International Publication No. WO 2021/017348, may be additionally provided between the upper end of the container inlet 12 and the bottom surface of the partition wall portion 140.

For example, one or more first concave-convex portions 871 may be formed at the upper end of the container inlet 12, and a second concave-convex portion 872 may be formed on the bottom surface of the partition wall portion 140 so as to be shape-fitted to and in close contact with the first concave-convex portions 871 in a state in which the container coupling portion 111 is coupled to the container inlet 12.

The first concave-convex portions 871 include one or more protrusions and recesses formed at the upper end of the container inlet 12, and may have various configurations depending on the shape of the second concave-convex portion 872 which will be described later.

For example, the first concave-convex portions 871 may include a pair of protrusions that form a groove so that a protrusion of the second concave-convex portion 872 is inserted, which will be described later.

Here, the first concave-convex portions 871 are shown just as protrusions in the cross-sectional structure, and have a ring shape when viewed from the top.

The second concave-convex portion 872 is configured to be formed at the lower end of the partition wall portion 140 to be shape-fitted to and in close contact with the first concave-convex portions 871 in a state in which the container coupling portion 111 is coupled to the container inlet 12, and the second concave-convex portion may have various configurations.

For example, the second concave-convex portion 872 may include a protrusion which is inserted into the groove formed by the pair of protrusions of the first concave-convex portions 871 described above.

Figure 11:
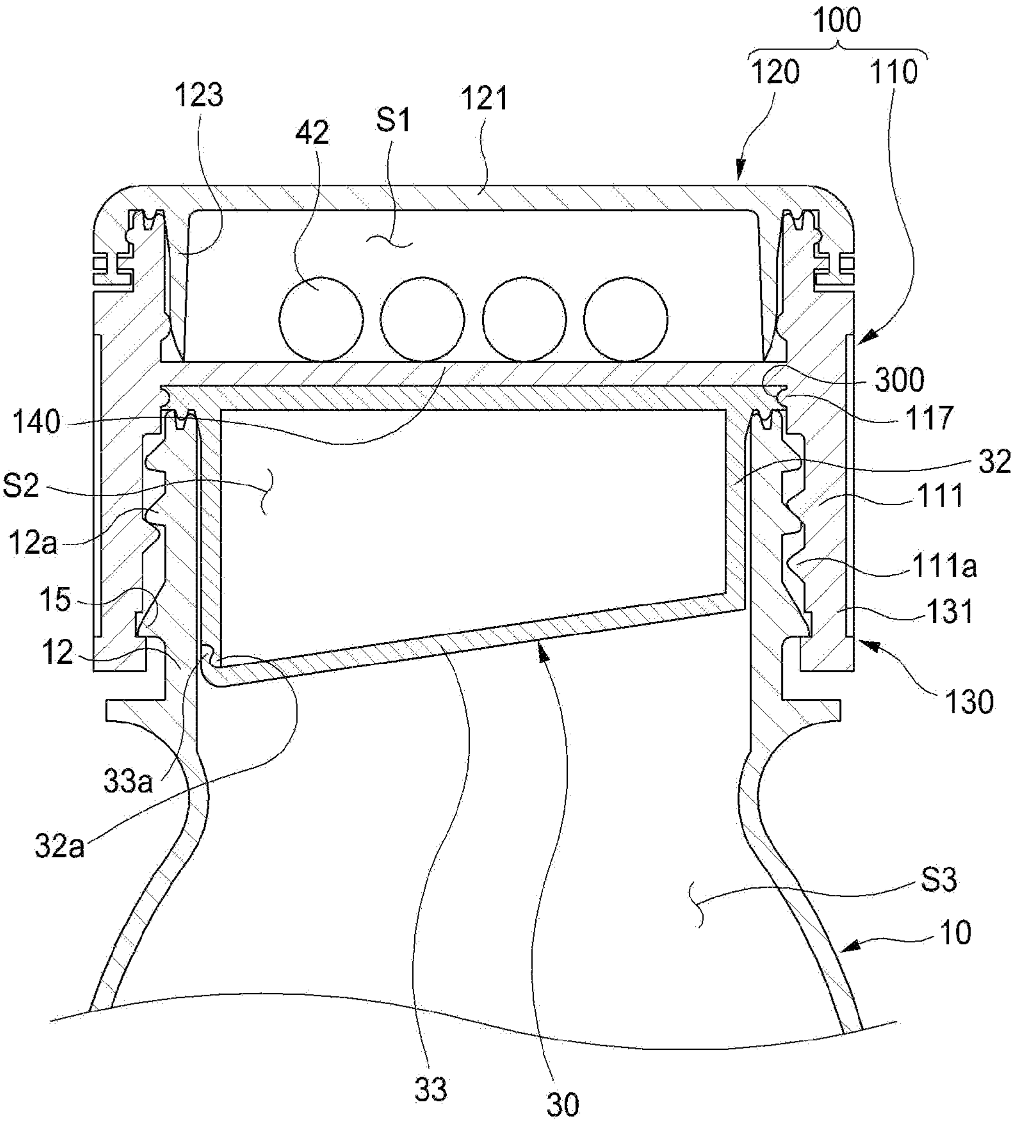
FIG. 11 is a partial cross-sectional view showing a container stopper according to a fifth embodiment of the present invention.

Also, when the auxiliary container 30 is provided as in the second and third embodiments of the present invention, a fifth embodiment may be configured such that a second concave-convex portion 872 is formed on the bottom surface of the upper portion 31 of the auxiliary container 30 instead of the partition wall portion 140 as illustrated in FIG. 11.

Also, as a modification example of the first and fourth embodiments illustrated in FIGS. 1 to 11, the partition wall portion 140 may have one or more discharge holes 148 for discharging the contents contained in the container 10.

Hereinafter, a container stopper according to a fifth embodiment of the present invention will be described with reference to the accompanying drawings.

The container stopper according to the fifth embodiment of the present invention is characterized in that, as a modification example of the first and fourth embodiments, one or more discharge holes 148 are formed in the partition wall portion 140. Various configurations are possible depending on the formation structure of the discharge holes 148 and the sealing structure thereof.

Figure 12:
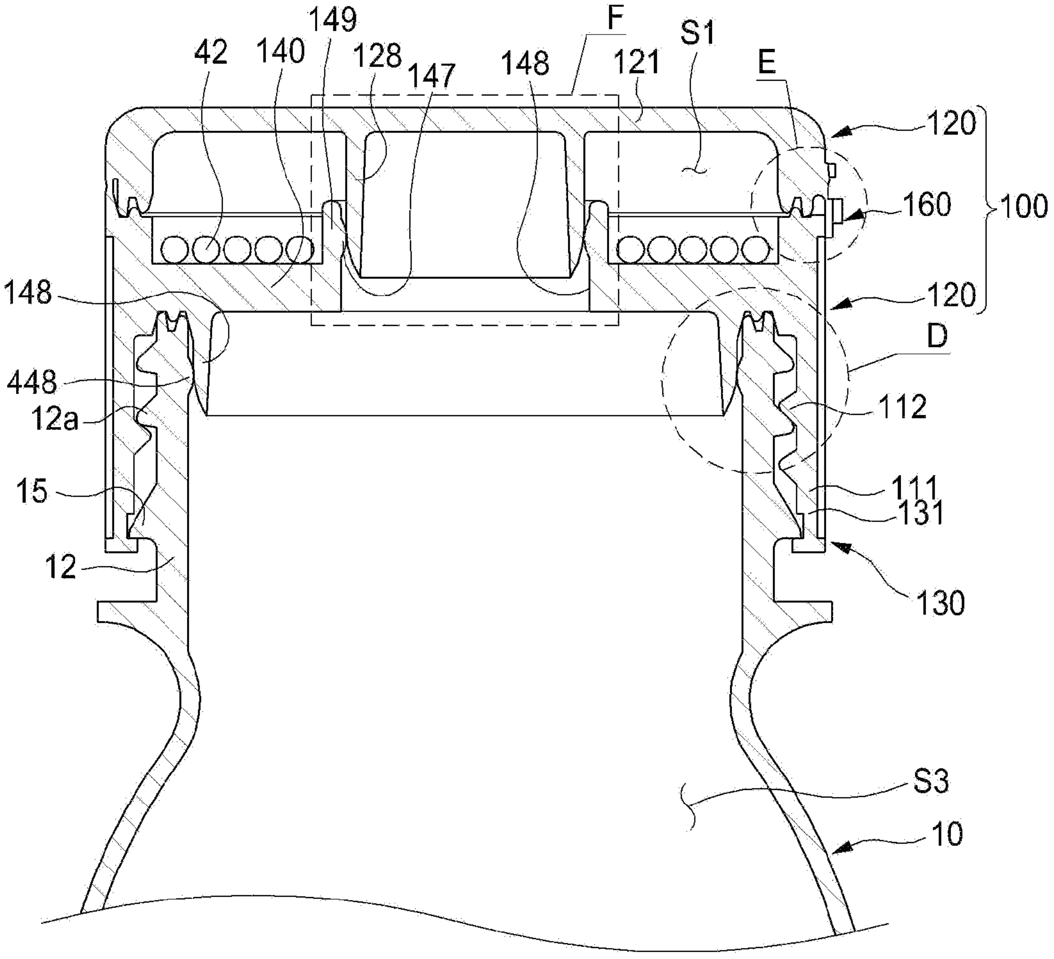
FIG. 12 is a partial cross-sectional view showing a container stopper according to a sixth embodiment of the present invention.
Figure 13:
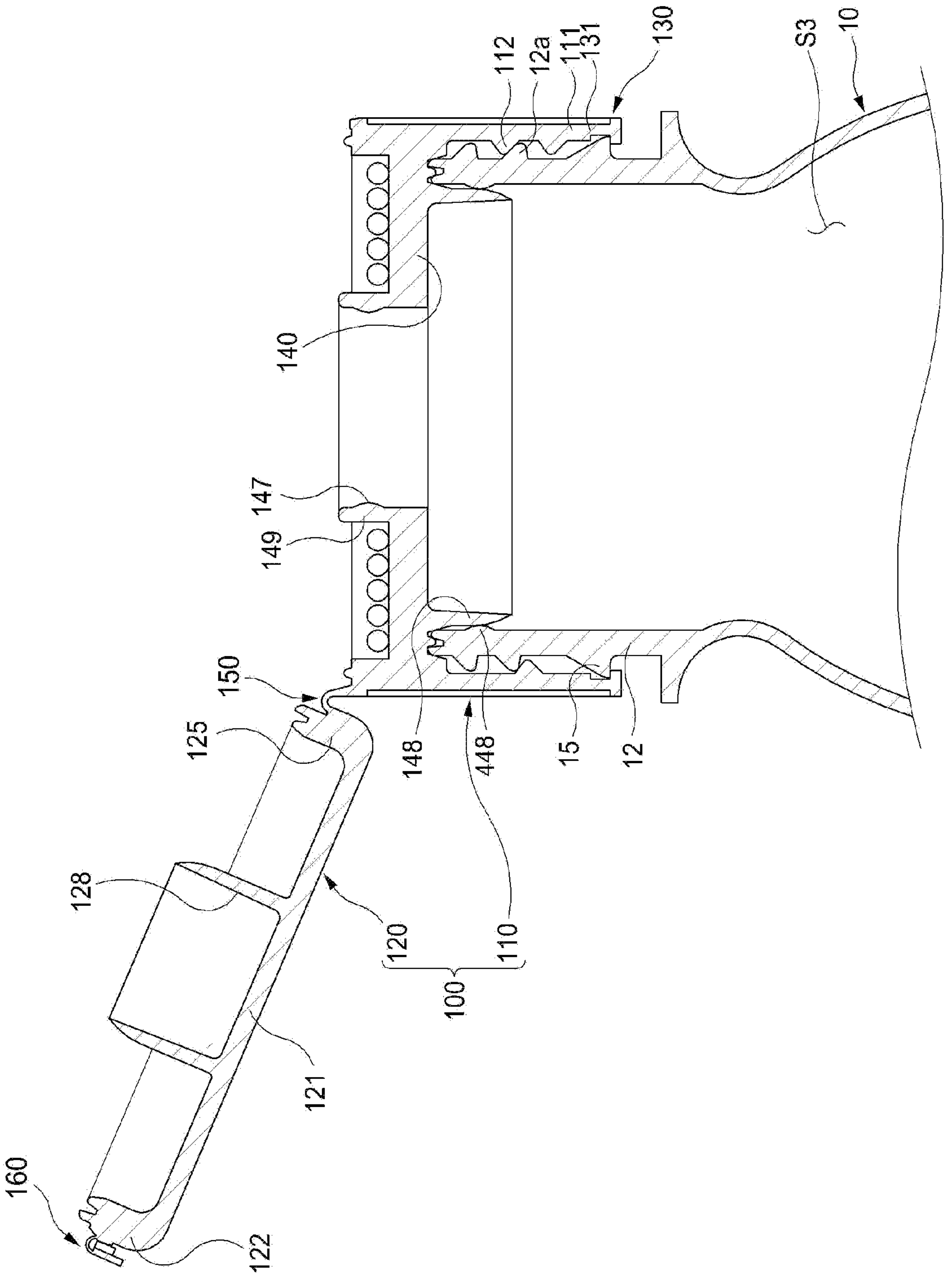
FIG. 13 is a partial cross-sectional view showing a state in which an upper cover of the container stopper of FIG. 12 is separated from a stopper body.
Figure 14:
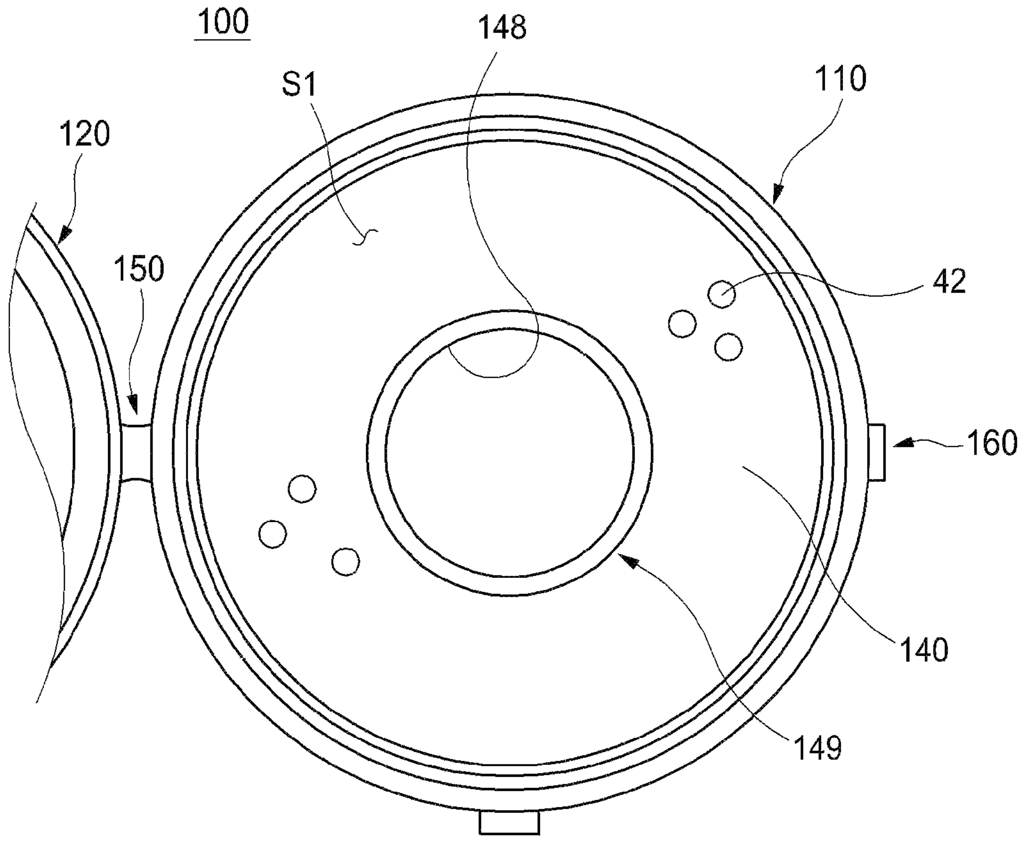
FIG. 14 is a plan view showing the stopper body in the container stopper of FIG. 12.

In the container stopper according to the fifth embodiment of the present invention, one or more discharge holes 148 for discharging the contents contained in the container 10 may be formed in the partition wall portion 140 as a first example illustrated in FIGS. 12 to 14.

The one or more discharge holes 148 are formed in the partition wall portion 140 and configured to discharge the contents contained in the container 10, and these discharge holes may have various configurations.

Figure 15:
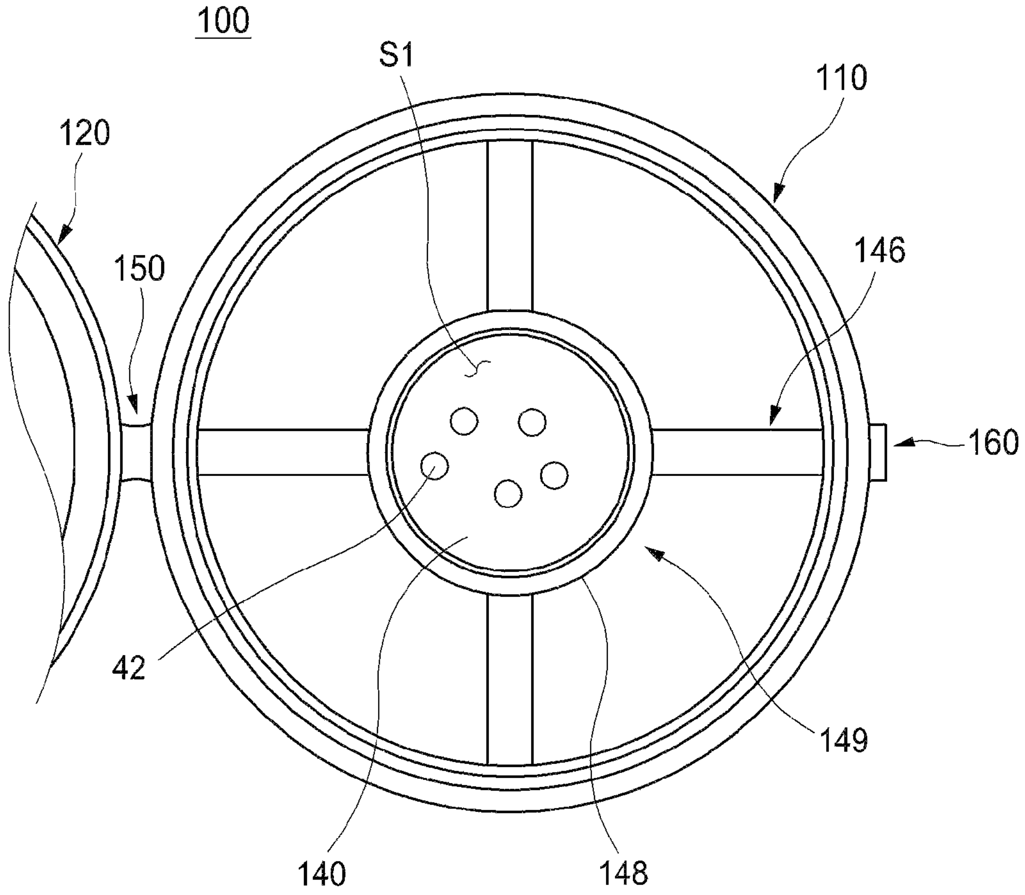
FIGS. 15 and 16 are plan views showing modified examples of FIG. 14.

As formation examples of the discharge holes 148, the discharge hole may be formed at the central region of the partition wall portion 140 as illustrated in FIGS. 12 to 14. Also, the auxiliary space S1 is positioned at the center, and the discharge hole 148 may be formed in a portion or the entirety of the outer circumference of the auxiliary space S1 as illustrated in FIG. 15.

When the auxiliary space S1 is positioned at the central region and the discharge hole 148 is formed in the entirety of the outer circumference of the auxiliary space S1, the partition wall portion 140 may be coupled to the inner circumferential surface of the stopper body 140 by a plurality of bridges 146.

Also, the discharge hole 148 may be formed by an upper protrusion portion 149 that extends, above the partition wall portion 140, from the edge of the vertically penetrated discharge hole 148.

Figure 16:
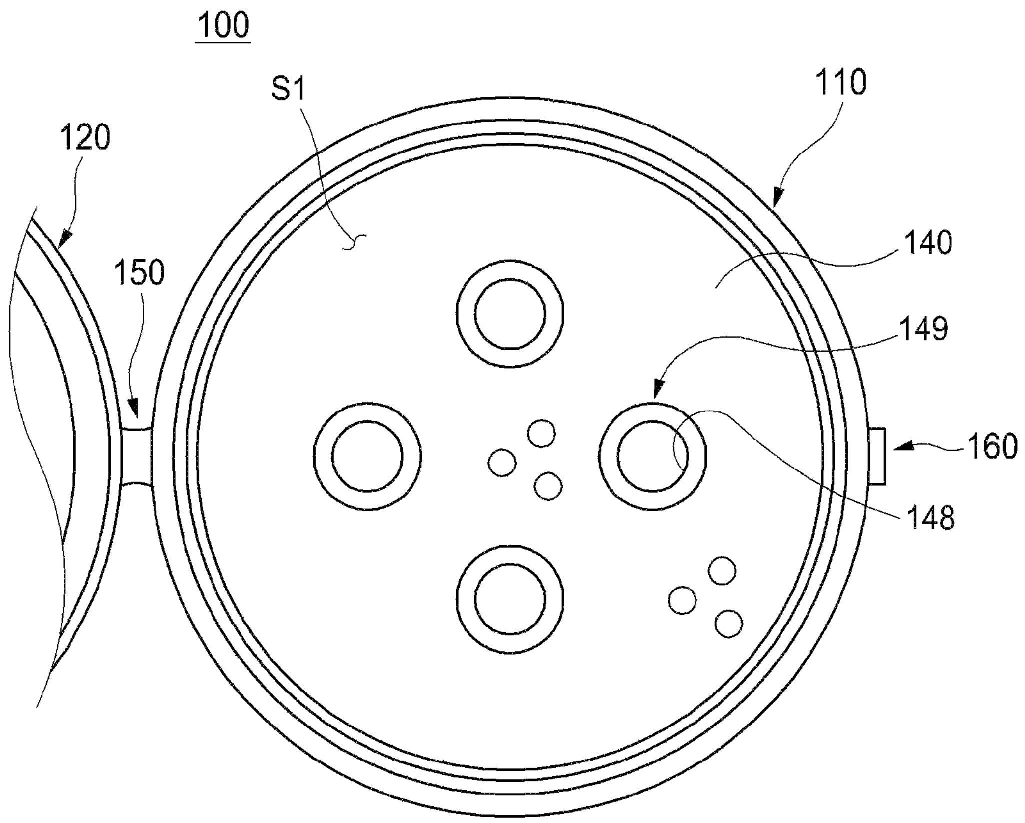

Also, as a formation example of the discharge hole 148, a plurality of discharge holes 148 may be formed as illustrated in FIG. 16.

Figure 22A:
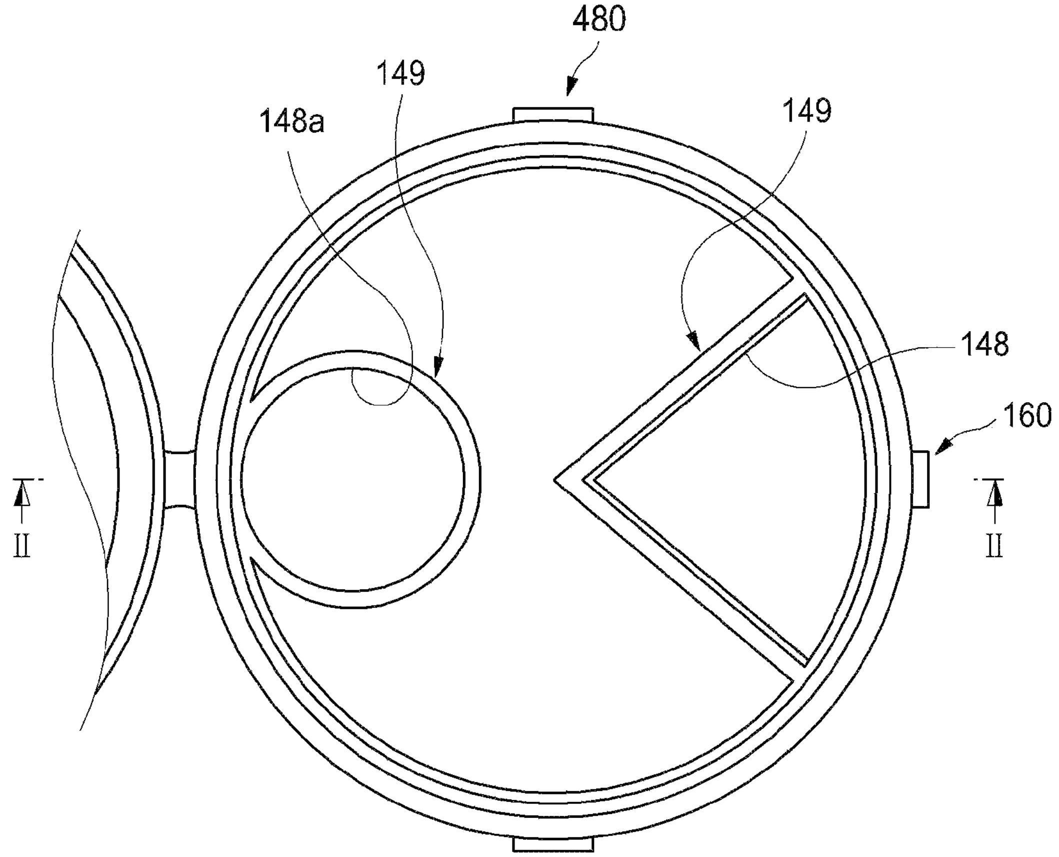
FIG. 22A is a plan view showing an modified example of FIG. 14.
Figure 22B:
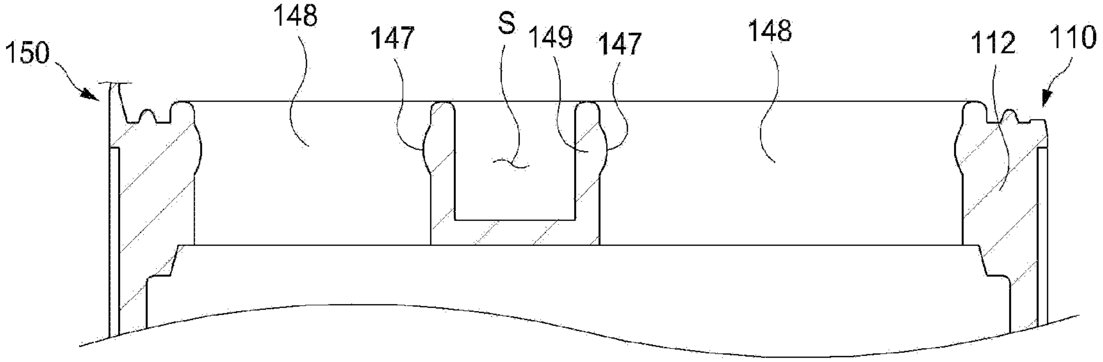
FIG. 22B is a cross-sectional view taken along line II-II of FIG. 22A.

Also, as a formation example of the discharge hole 148, when the stopper body 110 is viewed from above as illustrated in FIGS. 22A and 22B, the discharge hole 148 is positioned on one side, in particular, positioned biased to a region in which the handle portion 160 is located, and the partition wall portion 140 may be formed in the other regions.

Also, in the discharge hole 148, the auxiliary space S1 and the inner space S3 of the container 10 may be isolated from each other by a blocking portion 128 provided in the upper cover 120.

The blocking portion 128 is provided in the upper cover 120 and configured to isolate the auxiliary space S1 from the inner space S3 of the container 10 when the upper cover 120 is coupled to the stopper body 110, and this blocking portion may have various configurations depending on blocking methods.

For example, the blocking portion 128 may have the similar configuration as the cover inner ring 123 described above.

Specifically, the blocking portion 128 is configured to be in close contact with the inner circumferential surface of the upper protrusion portion 149 in a state in which the upper cover 120 is coupled to the cover coupling portion 112, and this blocking portion may have various configurations.

For example, the blocking portion 128 may protrude downward from the bottom surface of the upper cover 120.

In addition, the blocking portion 128 has a thickness that enables elastic deformation in consideration of close contact with the inner circumferential surface of the upper protrusion portion 149, and it is preferable that the thickness thereof decreases gradually in the downward direction.

In addition, in consideration of being inserted into the inner circumferential surface of the upper protrusion portion 149, it is preferable that the outer circumferential surface of the blocking portion 128 forms an inclination toward the center in a direction toward the lower end.

Also, in order to reinforce a sealing state when the blocking portion 128 is in close contact with the inner circumferential surface of the upper protrusion portion 149, one or more annular protrusion portions 147 may be further provided, which protrude from the inner circumferential surface of the upper protrusion portion 149 to be in close contact with the outer circumferential surface of the blocking portion 128.

The annular protrusion portions 147 have one or more ring structures that protrude from the inner circumferential surface of the upper protrusion portion 149 so as to be in close contact with the outer circumferential surface of the blocking portion 128. These annular protrusion portions may have a structure that protrudes convexly from the inner circumferential surface of the upper protrusion portion 149.

Figure 19:
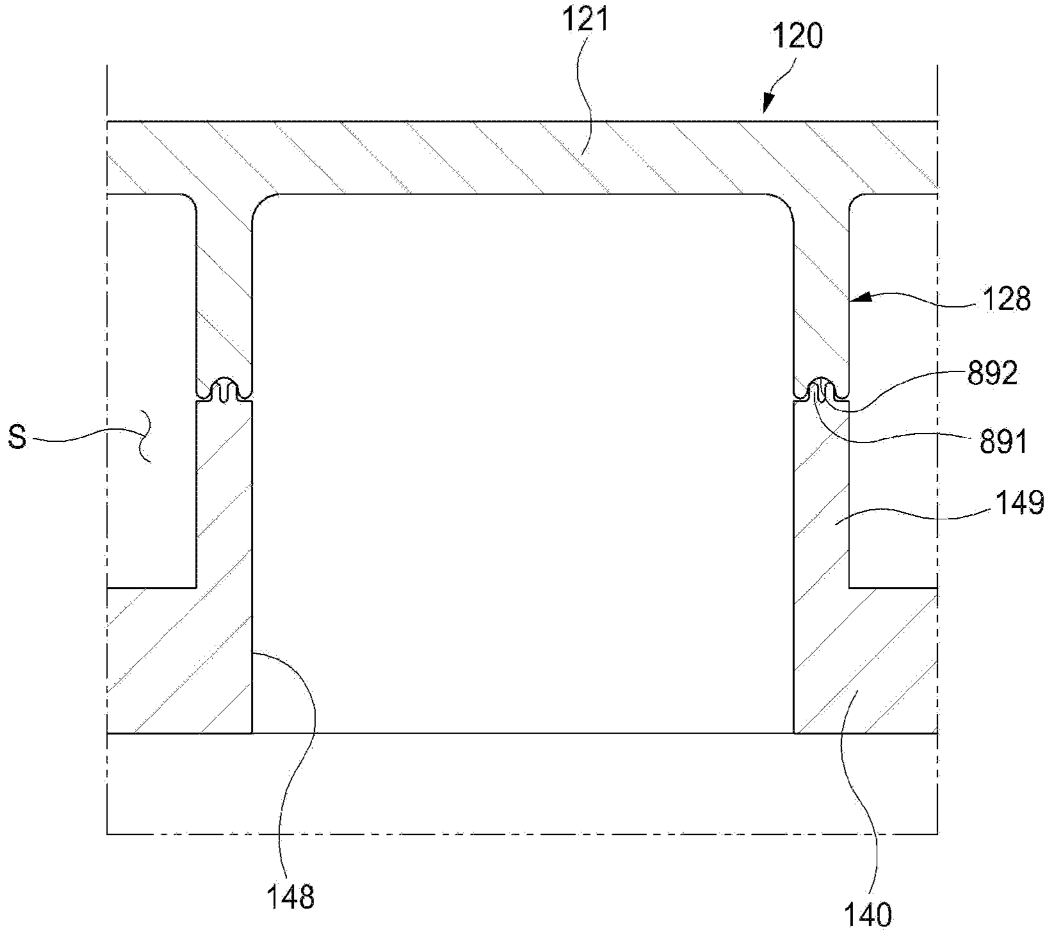
FIGS. 19 and 20 are enlarged cross-sectional views showing modified structures of the region E of FIG. 14.
Figure 20:
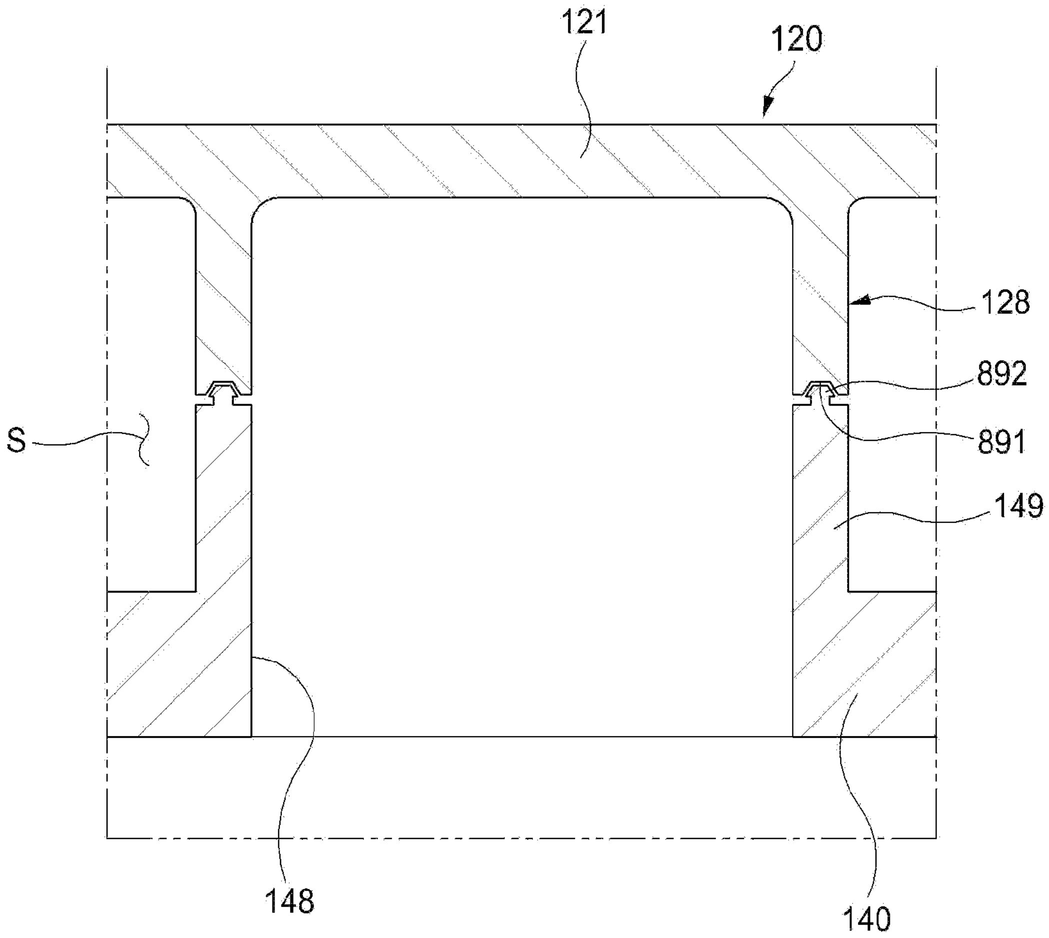

In addition, the blocking structure of the discharge hole 148 by the blocking portion 128 may have various embodiments as illustrated in FIGS. 19 and 20.

For example, as a structure for preventing the contents from flowing in between the lower end of the blocking portion 128 and the upper end of the upper protrusion portion 149, an annular protrusion portion 891 and an annular recess groove portion 892 into which the annular protrusion portion 891 is inserted may be formed at the upper end of the upper protrusion portion 149 and the lower end of the blocking portion 128, respectively.

Here, one annular protrusion portion 891 may be formed as illustrated in FIG. 20, or two or more may be formed as illustrated in FIG. 19.

Also, in order to reinforce the contact state when the annular protrusion portion 891 is inserted, the annular recess groove portion 892 may have a tapered shape of which the width is reduced toward the inside.

In addition, as described above, a structure for sealing the container 10, such as the structure disclosed in International Publication No. WO 2021/017348, may be additionally provided between the upper end of the container inlet 12 and the bottom surface of the partition wall portion 140.

Figure 17:
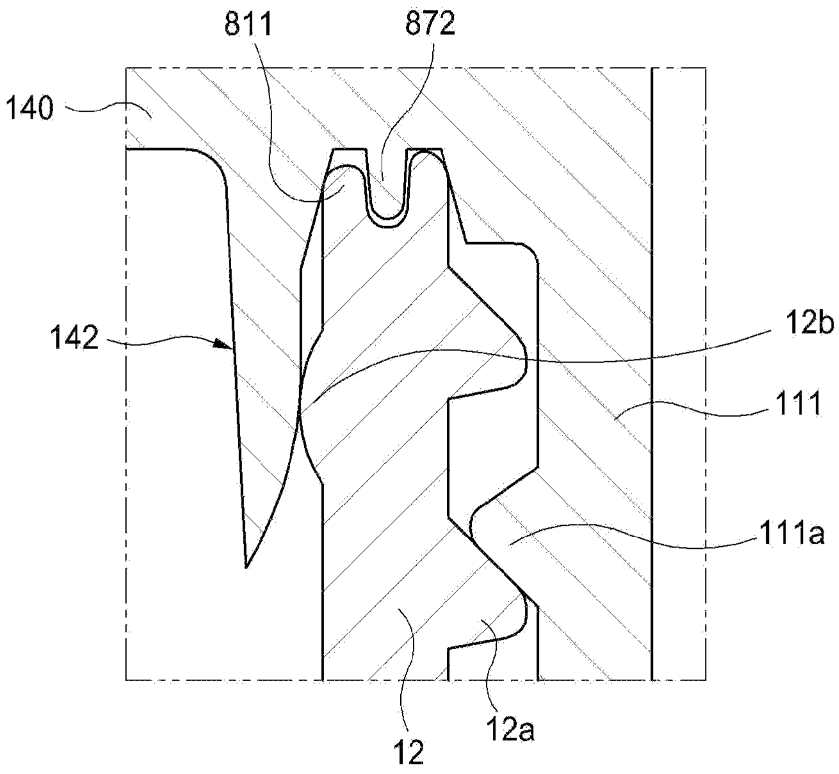
FIG. 17 is an enlarged cross-sectional view of a region D of FIG. 14.
Figure 18:
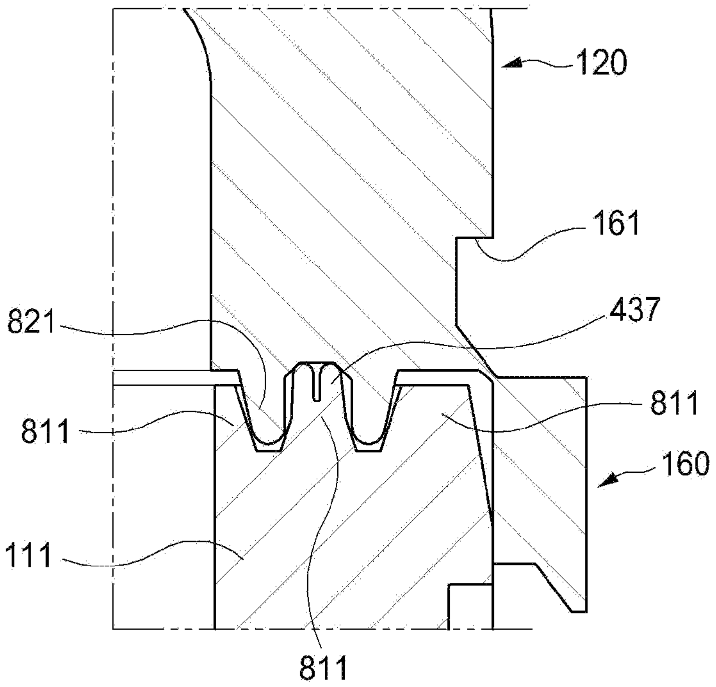
FIG. 18 is an enlarged cross-sectional view of a region E of FIG. 14.

As illustrated in FIG. 17, the upper end of the container inlet 12 and the bottom surface of the partition wall portion 140 may have similar structures to the first concave-convex portions 871 and the second concave-convex portion 872 as in the fourth embodiment (see FIG. 10).

The sealing coupling between the upper cover 120 and the cover coupling portion 112 may be established by the sealing means (see FIG. 9) described in the first to fifth embodiments. For example, this sealing coupling may include a similar structure to the example illustrated in FIG. 9 of the third embodiment.

In addition, in order to prevent the upper cover 120 from being arbitrarily separated from the stopper body 110, the container stopper according to the present invention may further include a separation preventing means.

The separation preventing means is configured to prevent the upper cover 120 from being arbitrarily separated from the stopper body 110, and this separation preventing means may have various configurations.

Figure 21A:
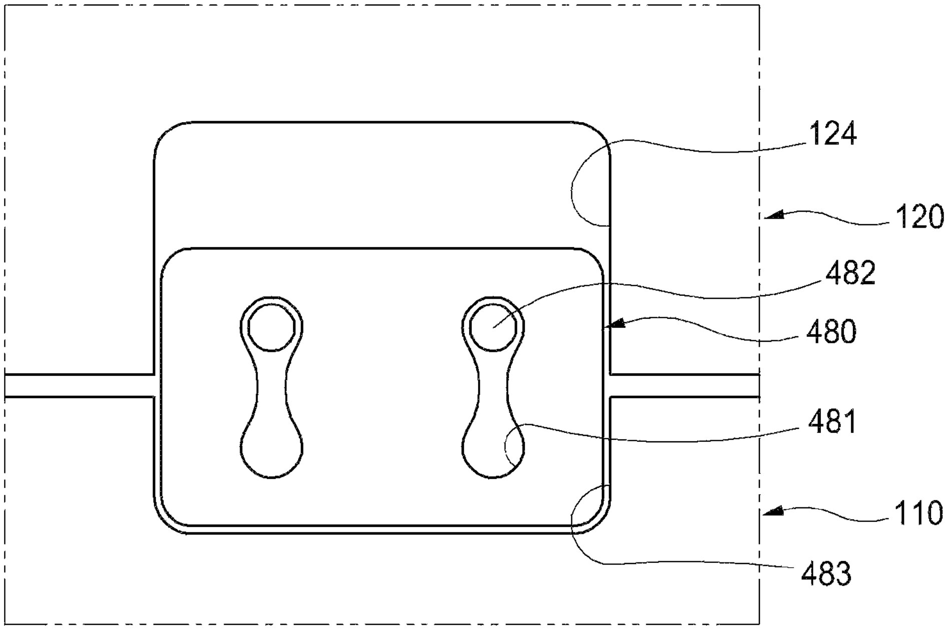
FIGS. 21A and 21B are side views showing structures for preventing the upper cover from being arbitrarily separated from the stopper body as modified examples of the container stopper of FIG. 14.
Figure 21B:
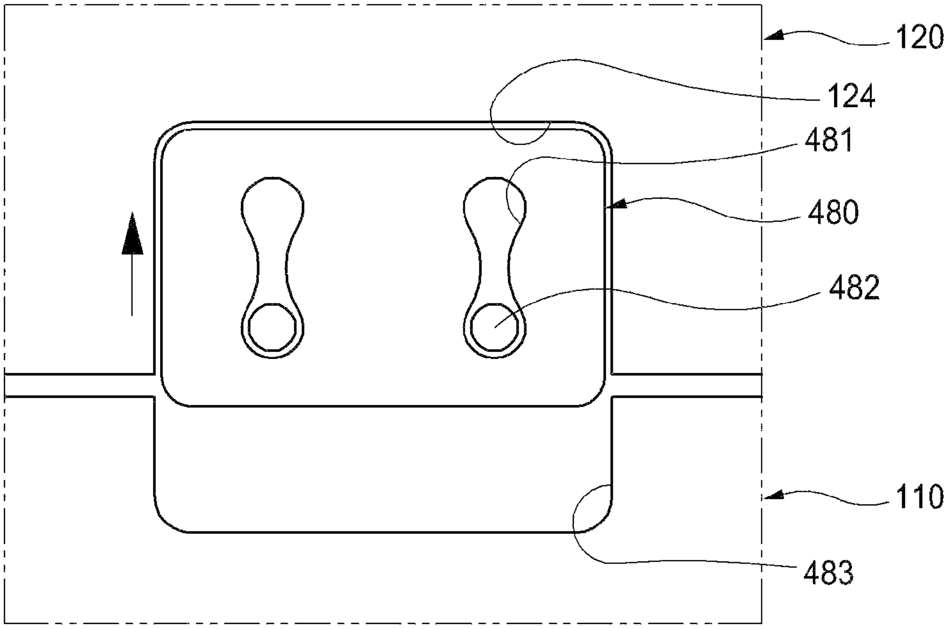

For example, as illustrated in FIGS. 21A and 21B, the separation preventing means may include: a moving member 480 which is inserted into a first recess groove 483 formed on the outer circumferential surface of the cover coupling portion 112; and a guide portion 482 which allows a user to guide the movement of the moving member 480 from the first recess groove 483 to a second recess groove 124 formed on the outer circumferential surface of the upper cover 120.

The moving member 480 is inserted into the first recess groove 483 formed on the outer circumferential surface of the cover coupling portion 112 so as to prevent the upper cover 120 from being arbitrarily separated from the stopper body 110, and then, this moving member is moved to the second recess groove 124 by the user so as to separate the upper cover 120 from the stopper body 110. This moving member may have various configurations.

Here, the guide portion 482 having a protrusion structure is inserted into the moving member 480, and the moving member has a slot 481 that is formed vertically and can move up and down with respect to the guide portion 482.

The slot 481 is a through hole formed in the moving member 480 so that the guide portion 482 having a protrusion structure is inserted into this through-hole, and the through-hole can move up and down with respect to the guide portion 482. The upper end and lower end of this through hole may have substantially the same size as the outer diameter of the guide portion 482, and the middle portion thereof may be slightly smaller than the outer diameter of the guide portion 482.

Also, the guide portion 482 is configured to allow the user to guide the movement of the moving member 480 from the first recess groove 483 to the second recess groove 124 formed on the outer circumferential surface of the upper cover 120. This guide portion 482 may include one or more protrusions that protrude outward so that the protrusions can be inserted into slots 481 formed in the moving member 480, and may preferably include a pair of protrusions.

Also, by using the container to which the container stopper according to the present invention having the above configuration is coupled, it is possible to drink in various ways.

For example, first, a user separates the upper cover 120 from the stopper body 110, that is, the cover coupling portion 111 and then takes the auxiliary contents 42 contained in the auxiliary space S1. Subsequently, the user separates the stopper body 110 from the container 10 and then can drink the contents contained in the container 10.

Also, the user separates the stopper body 110 from the container 10 and then drink the contents contained in the container 10. Subsequently, the user couples the stopper body 110 to the container 10, separates the upper cover 120 from the stopper body 110, that is, the cover coupling portion 111, and then takes the auxiliary contents 42 contained in the auxiliary space S1. Accordingly, the contents and auxiliary contents can be taken in various ways.

The above is merely described with respect to some preferred embodiments that may be implemented according to the present invention. Thus, as is well known, the scope of the present invention should not be construed as being limited by the above embodiments, and the technical ideas of the present invention described above and technical concepts on the basis of these technical ideas are considered to be included in the scope of the present invention.

The invention claimed is:

1. A container stopper coupled to a container inlet of a container in which content is held, the container stopper comprising:

a stopper body that is coupled to the container inlet and has, on an upper side thereof, an auxiliary space in which auxiliary content having a granular structure is held; and an upper cover that is coupled to the stopper body, forms the auxiliary space together with the stopper body, and covers the auxiliary space;

wherein the stopper body comprises:

a container coupling portion coupled to the container inlet; and a cover coupling portion extending upward from the container coupling portion and coupled to the upper cover, wherein the container coupling portion and the cover coupling portion are divided vertically by a partition wall portion coupled to an inner circumferential surface thereof, wherein the upper cover and the cover coupling portion are provided with a sealing means for sealing the auxiliary space when coupled to each other, wherein the sealing means comprises a cover inner ring that is in close contact with the inner circumferential surface of the cover coupling portion in a state in which the upper cover is coupled to the cover coupling portion, wherein the sealing means comprises:

one or more first concave-convex portions formed at an upper end of the cover coupling portion; and a second concave-convex portion which is formed at a lower end of the upper cover to be shape-fitted to and in close contact with the first concave-convex portions in a state in which the upper cover is coupled to the cover coupling portion, and wherein the first concave-convex portions comprise a pair of protrusions that form a groove so that a protrusion of the second concave-convex portion is inserted.

2. The container stopper of claim 1, wherein the stopper body is coupled to the container inlet in a screw coupling or snap-fit coupling manner.

3. The container stopper of claim 1, wherein the partition wall portion is formed integrally with the stopper body.

4. The container stopper of claim 3, wherein the upper cover is coupled to the cover coupling portion in a screw coupling or snap-fit coupling manner.

5. The container stopper of claim 4, wherein the upper cover is coupled to the cover coupling portion by a hinge portion at one end of a reference line that passes through a center of the upper cover, and is detached by rotating about the hinge portion with respect to the cover coupling portion.

6. The container stopper of claim 1, wherein the partition wall portion is insertion-coupled to a recess groove or a protrusion formed on an inner circumferential surface of the stopper body.

7. The container stopper of claim 6, wherein the upper cover is coupled to the cover coupling portion in a screw coupling or snap-fit coupling manner.

8. The container stopper of claim 7, wherein the upper cover is coupled to the cover coupling portion by a hinge portion at one end of a reference line that passes through a center of the upper cover, and is detached by rotating about the hinge portion with respect to the cover coupling portion.

9. The container stopper of claim 1, wherein the sealing means comprises one or more annular protrusion portions which protrude from the inner circumferential surface of the cover coupling portion to be in close contact with an outer circumferential surface of the cover inner ring.

10. The container stopper of claim 9, wherein the upper cover is coupled to the cover coupling portion in a screw coupling or snap-fit coupling manner.

11. The container stopper of claim 10, wherein the upper cover is coupled to the cover coupling portion by a hinge portion at one end of a reference line that passes through a center of the upper cover, and is detached by rotating about the hinge portion with respect to the cover coupling portion.

12. The container stopper of claim 1, wherein the upper cover is coupled to the cover coupling portion in a screw coupling or snap-fit coupling manner.

13. The container stopper of claim 12, wherein the upper cover is coupled to the cover coupling portion by a hinge portion at one end of a reference line that passes through a center of the upper cover, and is detached by rotating about the hinge portion with respect to the cover coupling portion.

14. The container stopper of claim 1, wherein one of the upper cover or the cover coupling portion has an annular protrusion, and another one of the upper cover or the cover coupling portion has an annular recess groove.

15. The container stopper of claim 14, wherein a coupling portion for coupling with a handle portion formed opposite to the hinge portion is formed on an outer circumferential surface of the upper cover.

* * * * *